US009194265B2

(12) United States Patent
Parikh et al.

(10) Patent No.: US 9,194,265 B2
(45) Date of Patent: Nov. 24, 2015

(54) ROTATING SEPARATOR WITH HOUSING PREVENTING SEPARATED LIQUID CARRYOVER

(71) Applicant: Cummins Filtration IP, Inc., Columbus, IN (US)

(72) Inventors: Chirag D. Parikh, Madison, WI (US); Arun Janakiraman, Janesville, WI (US); Saru Dawar, McFarland, WI (US); Jerald J. Moy, Oregon, WI (US); Himani Deshpande, Madison, WI (US); Brian W. Schwandt, Fort Atkinson, WI (US); Bridgette L. Meyer, Randolph, WI (US); Shiming Feng, Fitchburg, WI (US); Anna Balazy, Columbus, IN (US); Vincil A. Varghese, Stoughton, WI (US); Benjamin L. Scheckel, Stoughton, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 401 days.

(21) Appl. No.: 13/664,025

(22) Filed: Oct. 30, 2012

(65) Prior Publication Data
US 2013/0056407 A1    Mar. 7, 2013

Related U.S. Application Data

(63) Continuation-in-part of application No. 12/969,742, filed on Dec. 16, 2010, now Pat. No. 8,794,222, which (Continued)

(51) Int. Cl.
*F02B 25/06*   (2006.01)
*F01M 13/04*   (2006.01)

(Continued)

(52) U.S. Cl.
CPC ............... *F01M 13/04* (2013.01); *F02D 23/00* (2013.01); *B01D 17/0217* (2013.01);

(Continued)

(58) Field of Classification Search
CPC ............. F01M 2013/0422; F01M 2013/0427; F01M 2001/1035; B01D 45/14; B01D 17/0217; B01D 21/262
USPC .................................................. 123/572–574
See application file for complete search history.

(56) References Cited

U.S. PATENT DOCUMENTS

| 630,365 A | 8/1899 | LaPlace |
| 881,723 A | 3/1908 | Scheibe |

(Continued)

FOREIGN PATENT DOCUMENTS

| BE | 1 011 567 | 11/1999 |
| CN | 1671952 | 9/2005 |

(Continued)

OTHER PUBLICATIONS

Haldex, Alfdez Oil Mist Separator, www.haldex.com, Stockholm Sep. 2004, 6 pgs.

(Continued)

*Primary Examiner* — Marguerite McMahon
*Assistant Examiner* — James Kim
(74) *Attorney, Agent, or Firm* — Foley & Lardner LLP

(57) ABSTRACT

A rotating separator has a housing preventing separated liquid carryover. A plenum between the annular rotating separating filter element and the housing sidewall has one or more flow path separating guides minimizing the flow of separated liquid to the outlet. The flow path guides may include one or more fins and/or swirl flow dampers and/or a configured surface.

37 Claims, 18 Drawing Sheets

Related U.S. Application Data is a continuation-in-part of application No. 12/969,755, filed on Dec. 16, 2010, now Pat. No. 8,807,097.

(60) Provisional application No. 61/555,529, filed on Nov. 4, 2011, provisional application No. 61/298,630, filed on Jan. 27, 2010, provisional application No. 61/298,635, filed on Jan. 27, 2010, provisional application No. 61/359,192, filed on Jun. 28, 2010, provisional application No. 61/383,787, filed on Sep. 17, 2010, provisional application No. 61/383,790, filed on Sep. 17, 2010, provisional application No. 61/383,793, filed on Sep. 17, 2010.

(51) Int. Cl.
*F02D 23/00* (2006.01)
*B01D 45/14* (2006.01)
*B01D 17/02* (2006.01)
*B01D 21/26* (2006.01)
*F01M 1/10* (2006.01)
*F01M 13/00* (2006.01)

(52) U.S. Cl.
CPC .............. *B01D 21/262* (2013.01); *B01D 45/14* (2013.01); *F01M 2001/1035* (2013.01); *F01M 2013/0072* (2013.01); *F01M 2013/0422* (2013.01); *F01M 2013/0427* (2013.01); *F01M 2013/0438* (2013.01); *Y02T 10/144* (2013.01)

(56) References Cited

U.S. PATENT DOCUMENTS

| | | | |
|---|---|---|---|
| 1,306,421 A * | 6/1919 | Feltz ............................ 55/443 |
| 2,104,683 A | 1/1938 | Van Rosen et al. |
| 2,443,875 A | 6/1948 | Spangenberger |
| 2,553,742 A * | 5/1951 | Bloch ....................... 123/184.61 |
| 2,713,960 A | 7/1955 | Siegal |
| 2,714,960 A | 8/1955 | Schmid |
| 2,795,291 A | 6/1957 | Pierce |
| 3,073,516 A | 1/1963 | Glasson |
| 3,234,716 A * | 2/1966 | Sevin et al. ................. 210/360.1 |
| 3,289,397 A | 12/1966 | Schonewald et al. |
| 3,299,335 A | 1/1967 | Wessels |
| 3,333,703 A | 8/1967 | Scavuzzo |
| 3,343,342 A | 9/1967 | Du |
| 3,363,771 A | 1/1968 | Walters |
| 3,447,290 A | 6/1969 | Flory |
| 3,631,272 A | 12/1971 | Kirii et al. |
| 3,753,492 A | 8/1973 | Aiello et al. |
| 3,857,687 A | 12/1974 | Hamilton et al. |
| 3,935,487 A | 1/1976 | Czerniak |
| 4,138,234 A | 2/1979 | Kubesa |
| 4,189,310 A | 2/1980 | Hotta |
| 4,223,909 A | 9/1980 | Danner et al. |
| 4,249,221 A | 2/1981 | Cox et al. |
| 4,288,030 A | 9/1981 | Beazley et al. |
| 4,298,465 A * | 11/1981 | Druffel ........................ 210/304 |
| 4,311,933 A | 1/1982 | Riggs et al. |
| 4,329,968 A | 5/1982 | Ishikawa et al. |
| 4,411,675 A | 10/1983 | de Castella |
| 4,482,365 A | 11/1984 | Roach |
| 4,561,409 A | 12/1985 | Fernandez |
| 4,643,158 A * | 2/1987 | Giannotti ....................... 123/591 |
| 4,714,139 A | 12/1987 | Lorenz et al. |
| 4,871,455 A | 10/1989 | Terhune et al. |
| 4,908,050 A | 3/1990 | Nagashima et al. |
| 4,922,604 A | 5/1990 | Marshall et al. |
| 4,946,483 A * | 8/1990 | Coral ............................ 55/323 |
| 4,981,502 A | 1/1991 | Gottschalk |
| 5,035,797 A | 7/1991 | Janik |
| 5,045,192 A | 9/1991 | Terhune |
| 5,090,873 A | 2/1992 | Fain |
| 5,095,238 A | 3/1992 | Suzuki et al. |
| 5,171,430 A | 12/1992 | Beach et al. |
| 5,205,848 A * | 4/1993 | Blanc et al. ...................... 55/310 |
| 5,229,671 A | 7/1993 | Neidhard et al. |
| 5,300,223 A | 4/1994 | Wright |
| 5,342,519 A | 8/1994 | Friedmann et al. |
| 5,429,101 A | 7/1995 | Uebelhoer et al. |
| 5,450,835 A | 9/1995 | Wagner |
| 5,471,966 A | 12/1995 | Feuling |
| 5,536,289 A | 7/1996 | Spies et al. |
| 5,538,626 A | 7/1996 | Baumann |
| 5,548,893 A | 8/1996 | Koelfgen |
| 5,549,821 A | 8/1996 | Bounnakhom et al. |
| 5,556,542 A | 9/1996 | Berman et al. |
| 5,564,401 A * | 10/1996 | Dickson ......................... 123/573 |
| 5,575,511 A | 11/1996 | Kroha et al. |
| 5,643,448 A | 7/1997 | Martin et al. |
| 5,681,461 A | 10/1997 | Gullett et al. |
| 5,685,985 A | 11/1997 | Brown et al. |
| 5,702,602 A | 12/1997 | Brown et al. |
| 5,737,378 A | 4/1998 | Ballas et al. |
| 5,738,785 A | 4/1998 | Brown et al. |
| 5,755,842 A | 5/1998 | Patel et al. |
| 5,762,671 A | 6/1998 | Farrow et al. |
| 5,770,065 A | 6/1998 | Popoff et al. |
| 5,837,137 A | 11/1998 | Janik |
| 5,846,416 A | 12/1998 | Gullett |
| 5,911,213 A | 6/1999 | Ahlborn et al. |
| 6,006,924 A | 12/1999 | Sandford |
| 6,019,717 A | 2/2000 | Herman |
| 6,068,763 A | 5/2000 | Goddard |
| 6,123,061 A | 9/2000 | Baker et al. |
| 6,139,595 A | 10/2000 | Herman et al. |
| 6,139,738 A | 10/2000 | Maxwell |
| 6,146,527 A | 11/2000 | Oelschlagel |
| 6,152,120 A | 11/2000 | Julazadeh |
| 6,183,407 B1 * | 2/2001 | Hallgren et al. ................. 494/49 |
| 6,213,929 B1 | 4/2001 | May |
| 6,281,319 B1 | 8/2001 | Mentak |
| 6,364,822 B1 | 4/2002 | Herman et al. |
| 6,506,302 B2 | 1/2003 | Janik |
| 6,517,612 B1 | 2/2003 | Crouch et al. |
| 6,527,821 B2 | 3/2003 | Liu et al. |
| 6,640,792 B2 | 11/2003 | Harvey et al. |
| 6,701,580 B1 | 3/2004 | Bandyopadhyay |
| 6,709,477 B1 | 3/2004 | Haakansson et al. |
| 6,752,924 B2 | 6/2004 | Gustafson et al. |
| 6,755,896 B2 | 6/2004 | Szepessy et al. |
| 6,783,571 B2 * | 8/2004 | Ekeroth ............................ 95/8 |
| 6,821,319 B1 | 11/2004 | Moberg et al. |
| 6,858,056 B2 | 2/2005 | Kwan |
| 6,893,478 B2 | 5/2005 | Care et al. |
| 6,925,993 B1 | 8/2005 | Eliasson et al. |
| 6,986,805 B2 | 1/2006 | Gieseke et al. |
| 7,000,894 B2 | 2/2006 | Olson et al. |
| 7,022,163 B2 | 4/2006 | Olsson et al. |
| 7,081,145 B2 | 7/2006 | Gieseke et al. |
| 7,104,239 B2 | 9/2006 | Kawakubo et al. |
| 7,152,589 B2 | 12/2006 | Ekeroth et al. |
| 7,185,643 B2 | 3/2007 | Gronberg et al. |
| 7,235,177 B2 | 6/2007 | Herman et al. |
| 7,258,111 B2 | 8/2007 | Shieh et al. |
| 7,294,948 B2 | 11/2007 | Wasson et al. |
| 7,338,546 B2 | 3/2008 | Eliasson et al. |
| 7,377,271 B2 | 5/2008 | Hoffmann et al. |
| 7,396,373 B2 * | 7/2008 | Lagerstedt et al. ............. 55/406 |
| 7,465,341 B2 | 12/2008 | Eliasson |
| 7,473,034 B2 | 1/2009 | Saito et al. |
| 7,597,809 B1 * | 10/2009 | Roberts ......................... 210/693 |
| 7,614,390 B2 | 11/2009 | Holzmann et al. |
| 7,723,887 B2 | 5/2010 | Yang et al. |
| 7,824,459 B2 * | 11/2010 | Borgstrom et al. ............. 55/406 |
| 8,177,875 B2 | 5/2012 | Rogers et al. |
| 8,404,014 B2 * | 3/2013 | Israel et al. ................... 55/385.3 |
| 8,499,750 B2 | 8/2013 | Koyamaishi et al. |
| 2001/0012814 A1 | 8/2001 | May et al. |
| 2003/0024870 A1 | 2/2003 | Reinhart |
| 2003/0034016 A1 | 2/2003 | Harvey et al. |
| 2003/0233939 A1 | 12/2003 | Szepessy et al. |
| 2004/0168415 A1 | 9/2004 | Hilpert et al. |

(56) References Cited

U.S. PATENT DOCUMENTS

| | | |
|---|---|---|
| 2004/0206083 A1 | 10/2004 | Okuyama et al. |
| 2004/0214710 A1 | 10/2004 | Herman et al. |
| 2004/0226442 A1 | 11/2004 | Olsson et al. |
| 2005/0060970 A1 | 3/2005 | Polderman |
| 2005/0120685 A1 | 6/2005 | Fischer et al. |
| 2005/0178718 A1* | 8/2005 | Geibel et al. ............... 210/456 |
| 2005/0223687 A1 | 10/2005 | Miller et al. |
| 2006/0048761 A1 | 3/2006 | Ekeroth et al. |
| 2006/0090738 A1 | 5/2006 | Hoffmann et al. |
| 2006/0145555 A1 | 7/2006 | Petro et al. |
| 2006/0162305 A1 | 7/2006 | Reid |
| 2007/0062887 A1 | 3/2007 | Schwandt et al. |
| 2007/0084194 A1 | 4/2007 | Holm |
| 2007/0107703 A1 | 5/2007 | Natkin |
| 2007/0163215 A1 | 7/2007 | Lagerstadt |
| 2007/0289632 A1 | 12/2007 | Della Casa |
| 2008/0009402 A1 | 1/2008 | Kane et al. |
| 2008/0250772 A1 | 10/2008 | Becker et al. |
| 2008/0264251 A1 | 10/2008 | Szepessy |
| 2008/0290018 A1 | 11/2008 | Carew |
| 2008/0307965 A1* | 12/2008 | Hoffman et al. ............... 95/119 |
| 2009/0000258 A1 | 1/2009 | Carlsson et al. |
| 2009/0013658 A1 | 1/2009 | Borgstrom et al. |
| 2009/0025562 A1 | 1/2009 | Hallgren et al. |
| 2009/0025662 A1 | 1/2009 | Herman et al. |
| 2009/0050121 A1* | 2/2009 | Holzmann et al. ............ 123/573 |
| 2009/0126324 A1 | 5/2009 | Smith et al. |
| 2009/0178964 A1 | 7/2009 | Cline et al. |
| 2009/0186752 A1 | 7/2009 | Isaksson et al. |
| 2009/0223496 A1 | 9/2009 | Borgstrom et al. |
| 2009/0249756 A1 | 10/2009 | Schrage et al. |
| 2009/0266235 A1 | 10/2009 | Kane et al. |
| 2009/0272085 A1 | 11/2009 | Gieseke et al. |
| 2010/0011723 A1 | 1/2010 | Szepessy et al. |
| 2010/0043734 A1 | 2/2010 | Holzmann et al. |
| 2010/0180854 A1 | 7/2010 | Baumann et al. |
| 2010/0229537 A1 | 9/2010 | Holm |
| 2011/0017155 A1 | 1/2011 | Jacob |
| 2011/0056455 A1 | 3/2011 | Koyamaishi et al. |
| 2011/0180051 A1 | 7/2011 | Schwandt et al. |
| 2011/0180052 A1 | 7/2011 | Schwandt et al. |
| 2011/0247309 A1 | 10/2011 | Smith et al. |
| 2011/0252974 A1 | 10/2011 | Verdegan et al. |
| 2011/0281712 A1* | 11/2011 | Schlamann et al. .............. 494/7 |

FOREIGN PATENT DOCUMENTS

| | | |
|---|---|---|
| CN | 2809233 | 8/2006 |
| CN | 1961139 | 5/2007 |
| CN | 1961139 A | 5/2007 |
| CN | 101189414 | 5/2008 |
| CN | 101549331 | 10/2009 |
| EP | 844012 | 5/1998 |
| EP | 0880987 | 12/1998 |
| WO | 2009/005355 | 1/2009 |
| WO | WO-2009/138872 A1 | 11/2009 |
| WO | 2010/051994 | 5/2010 |
| WO | 2011005160 | 1/2011 |

OTHER PUBLICATIONS

Example of Simplified Squirrel Cage Motor, www.animations.physics.unsw.edu.au, p. 5, website visited Apr. 25, 2011.

\* cited by examiner

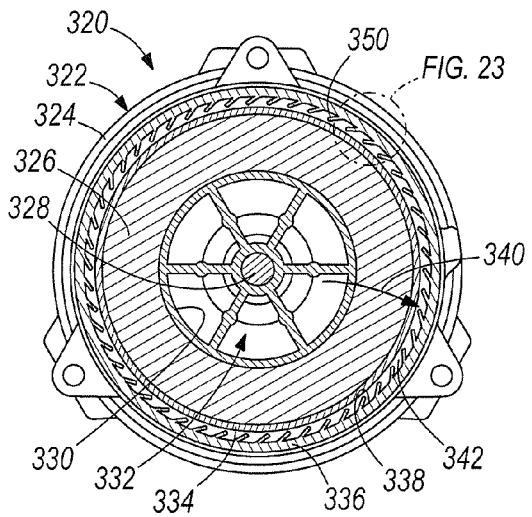
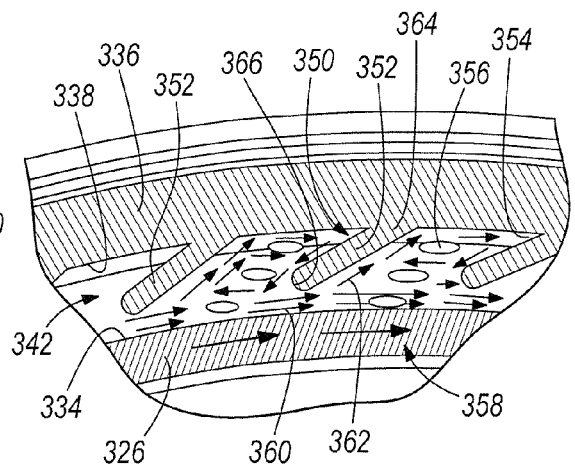
FIG. 22    FIG. 23
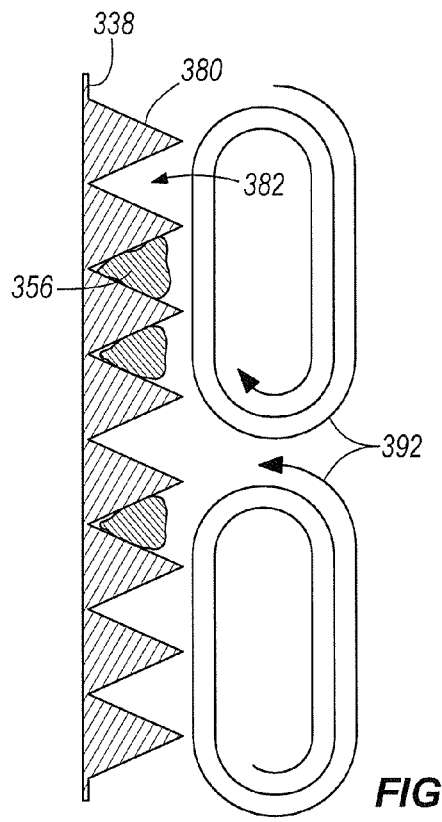
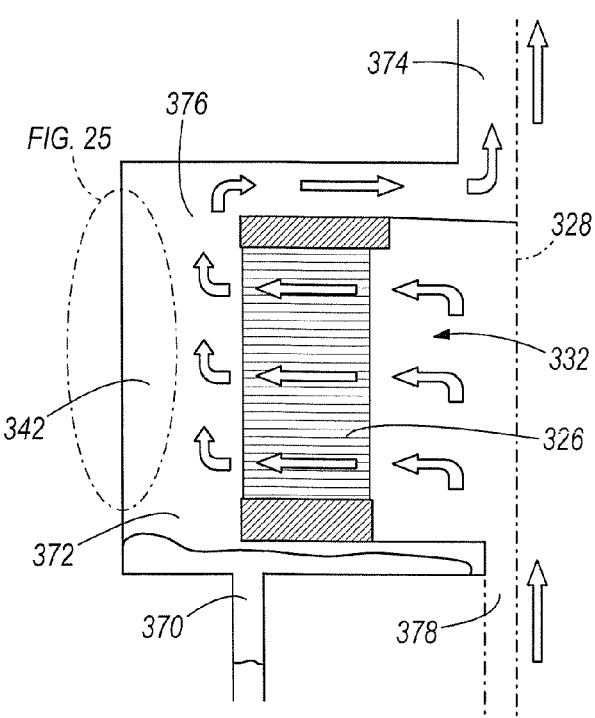
FIG. 25    FIG. 24

ROTATING SEPARATOR WITH HOUSING PREVENTING SEPARATED LIQUID CARRYOVER

CROSS-REFERENCE TO RELATED APPLICATIONS

The present application claims the benefit of and priority from Provisional U.S. Patent Application No. 61/555,529, filed Nov. 4, 2011. The present application is a continuation-in-part of U.S. patent application Ser. No. 12/969,742, filed Dec. 16, 2010, and U.S. patent application Ser. No. 12/969,755, filed Dec. 16, 2010. The '742 and '755 applications claim the benefit of and priority from Provisional U.S. Patent Application No. 61/298,630, filed Jan. 27, 2010, Provisional U.S. Patent Application No. 61/298,635, filed Jan. 27, 2010, Provisional U.S. Patent Application No. 61/359,192, filed Jun. 28, 2010, Provisional U.S. Patent Application No. 61/383,787, filed Sep. 17, 2010, Provisional U.S. Patent Application No. 61/383,790, filed Sep. 17, 2010, and Provisional U.S. Patent Application No. 61/383,793, filed Sep. 17, 2010. All of the above are hereby incorporated herein by reference.

BACKGROUND AND SUMMARY

Parent Applications

The noted parent '742 and '755 applications relate to internal combustion engine crankcase ventilation separators, particularly coalescers. Internal combustion engine crankcase ventilation separators are known in the prior art. One type of separator uses inertial impaction air-oil separation for removing oil particles from the crankcase blowby gas or aerosol by accelerating the blowby gas stream to high velocities through nozzles or orifices and directing same against an impactor, causing a sharp directional change effecting the oil separation. Another type of separator uses coalescence in a coalescing filter for removing oil droplets. The inventions of the parent '742 and '755 applications arose during continuing development efforts in the latter noted air-oil separation technology, namely removal of oil from the crankcase blowby gas stream by coalescence using a coalescing filter.

Present Application

The present disclosure arose during continuing development efforts in separating liquid from a fluid mixture, including the above noted technology, and including a rotating separator separating liquid from a fluid mixture, including air-oil and other liquid-fluid mixtures.

In one embodiment, the present disclosure provides a housing for an annular rotating separating filter element, which housing prevents separated liquid carryover.

BRIEF DESCRIPTION OF THE DRAWINGS

Parent Applications

FIG. 1 is a sectional view of a coalescing filter assembly.

FIG. 2 is a sectional view of another coalescing filter assembly.

FIG. 3 shows another embodiment for a drive mechanism.

FIG. 4 is a sectional view of another coalescing filter assembly.

FIG. 5 is a schematic view illustrating operation of the assembly of FIG. 4.

FIG. 6 is a schematic system diagram illustrating an engine intake system.

FIG. 7 is a schematic diagram illustrating a control option for the system of FIG. 6.

FIG. 8 is a flow diagram illustrating an operational control for the system of FIG. 6.

FIG. 9 is like FIG. 8 and shows another embodiment.

FIG. 10 is a schematic sectional view show a coalescing filter assembly.

FIG. 11 is an enlarged view of a portion of FIG. 10.

FIG. 12 is a schematic sectional view of a coalescing filter assembly.

FIG. 13 is a schematic sectional view of a coalescing filter assembly.

FIG. 14 is a schematic sectional view of a coalescing filter assembly.

FIG. 15 is a schematic sectional view of a coalescing filter assembly.

FIG. 16 is a schematic sectional view of a coalescing filter assembly.

FIG. 17 is a schematic view of a coalescing filter assembly.

FIG. 18 is a schematic sectional view of a coalescing filter assembly.

FIG. 19 is a schematic diagram illustrating a control system.

FIG. 20 is a schematic diagram illustrating a control system.

FIG. 21 is a schematic diagram illustrating a control system.

Present Application

Figure 1:
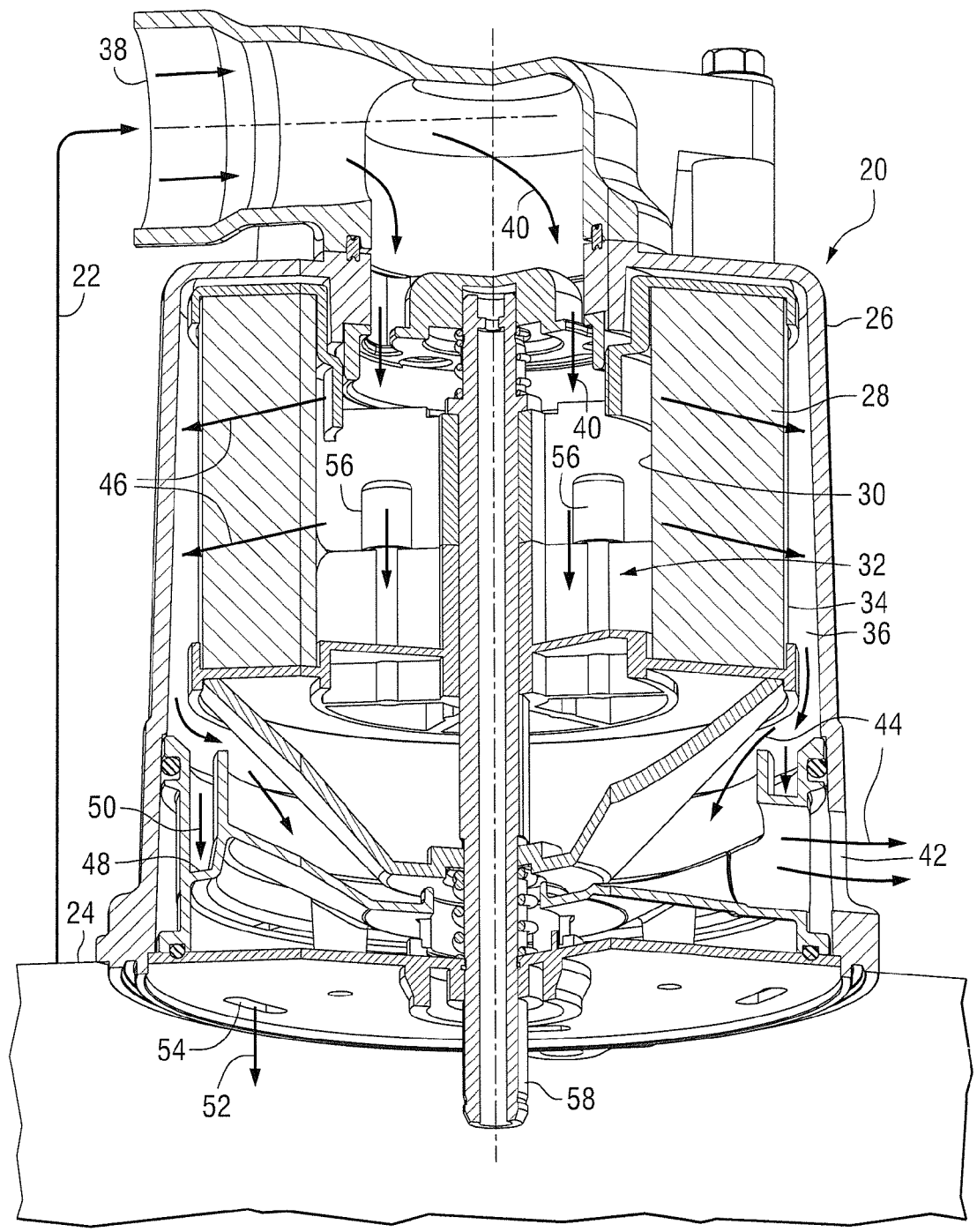
FIGS. 1-21 are taken from parent U.S. patent application Ser. No. 12/969,742.

FIG. 22 is a sectional view taken into the page of FIG. 1 and showing similar structure as in FIG. 1 but modified in accordance with the present disclosure.

FIG. 23 is an enlarged view of a portion of FIG. 22.

Figure 14:
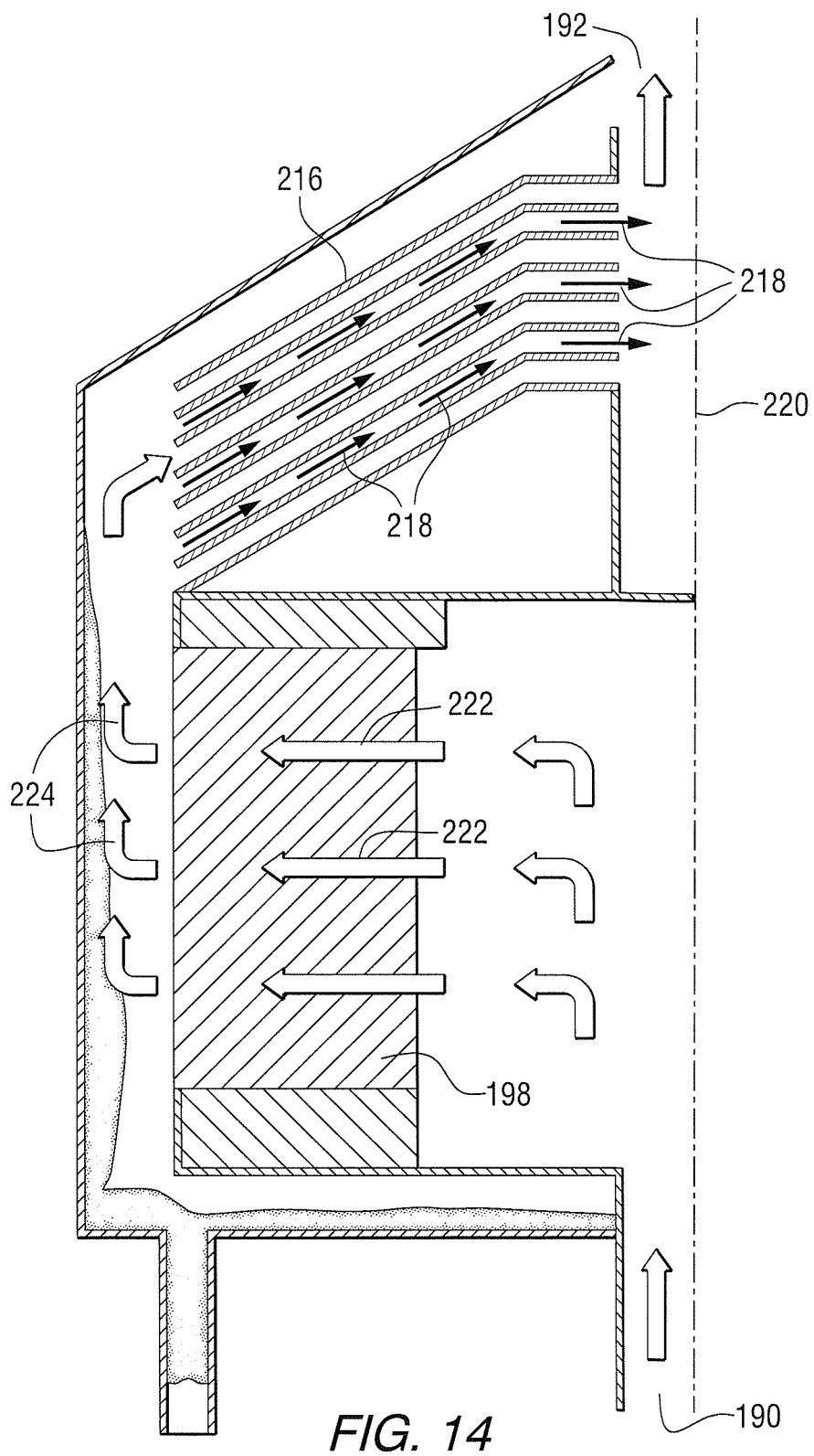

FIG. 24 is a view like a portion of FIG. 14.

FIG. 25 is an enlarged view of a portion of FIG. 24.

Figure 26:
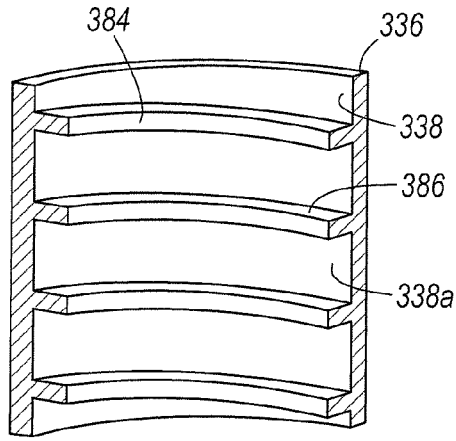

FIG. 26 is a perspective view of a portion of the sidewall structure of FIG. 22 and showing an alternate embodiment.

Figure 27:
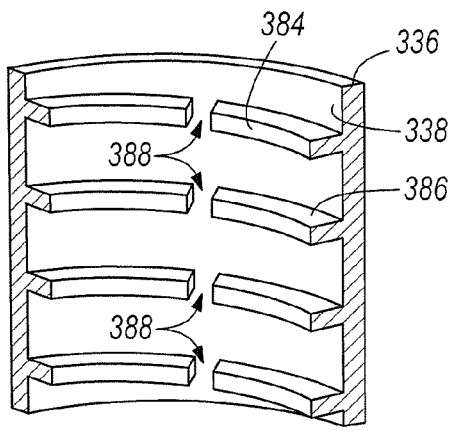

FIG. 27 is like FIG. 26 and shows another embodiment.

Figure 28:
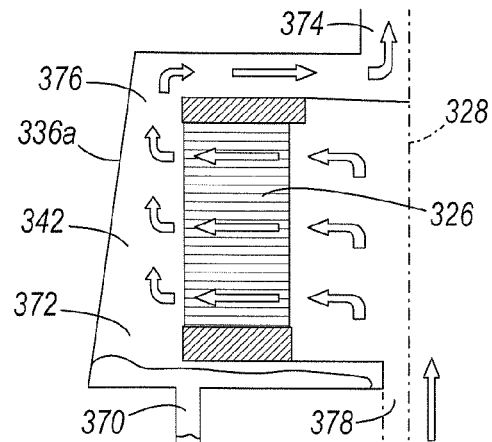

FIG. 28 is like FIG. 24 and shows another embodiment.

Figure 29:
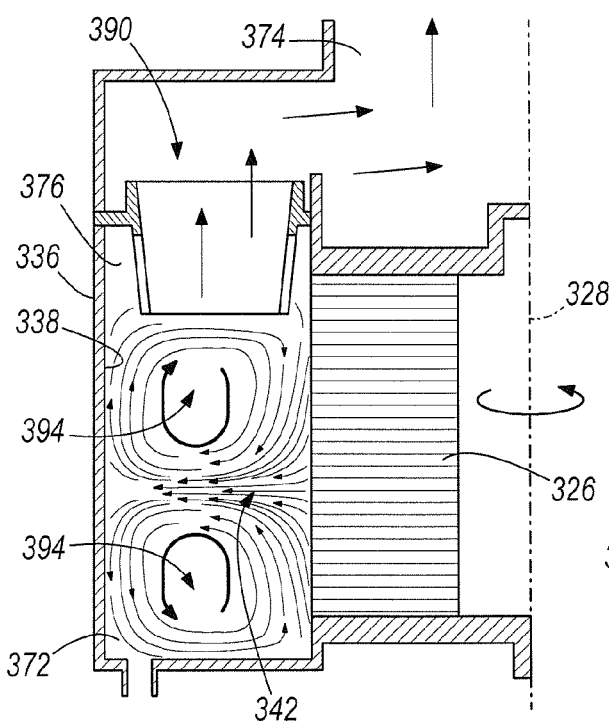

FIG. 29 is like FIG. 24 and shows another embodiment.

Figure 30:
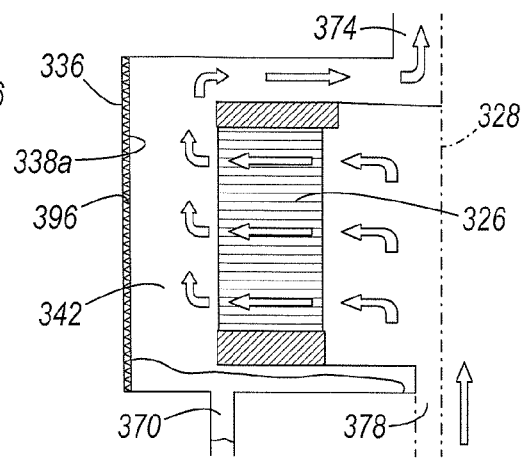

FIG. 30 is like FIG. 24 and shows another embodiment.

DETAILED DESCRIPTION

Parent Applications

The following description of FIGS. 1-21 is taken from commonly owned co-pending parent U.S. patent application Ser. No. 12/969,742, filed Dec. 16, 2010, which shares a common specification with commonly owned co-pending parent U.S. patent application Ser. No. 12/969,755, filed Dec. 16, 2010.

FIG. 1 shows an internal combustion engine crankcase ventilation rotating coalescer 20 separating air from oil in blowby gas 22 from engine crankcase 24. A coalescing filter assembly 26 includes an annular rotating coalescing filter element 28 having an inner periphery 30 defining a hollow interior 32, and an outer periphery 34 defining an exterior 36. An inlet port 38 supplies blowby gas 22 from crankcase 24 to hollow interior 32 as shown at arrows 40. An outlet port 42 delivers cleaned separated air from the noted exterior zone 36 as shown at arrows 44. The direction of blowby gas flow is inside-out, namely radially outwardly from hollow interior 32 to exterior 36 as shown at arrows 46. Oil in the blowby gas is forced radially outwardly from inner periphery 30 by centrifugal force, to reduce clogging of the coalescing filter element 28 otherwise caused by oil sitting on inner periphery 30. This also opens more area of the coalescing filter element to flow-through, whereby to reduce restriction and pressure drop. Centrifugal force drives oil radially outwardly from inner periphery 30 to outer periphery 34 to clear a greater volume of coalescing filter element 28 open to flow-through, to increase coalescing capacity. Separated oil drains from outer periphery 34. Drain port 48 communicates with exterior 36 and drains separated oil from outer periphery 34 as shown at arrow 50, which oil may then be returned to the engine crankcase as shown at arrow 52 from drain 54.

Centrifugal force pumps blowby gas from the crankcase to hollow interior 32. The pumping of blowby gas from the crankcase to hollow interior 32 increases with increasing speed of rotation of coalescing filter element 28. The increased pumping of blowby gas 22 from crankcase 24 to hollow interior 32 reduces restriction across coalescing filter element 28. In one embodiment, a set of vanes may be provided in hollow interior 32 as shown in dashed line at 56, enhancing the noted pumping. The noted centrifugal force creates a reduced pressure zone in hollow interior 32, which reduced pressure zone sucks blowby gas 22 from crankcase 24.

Figure 2:
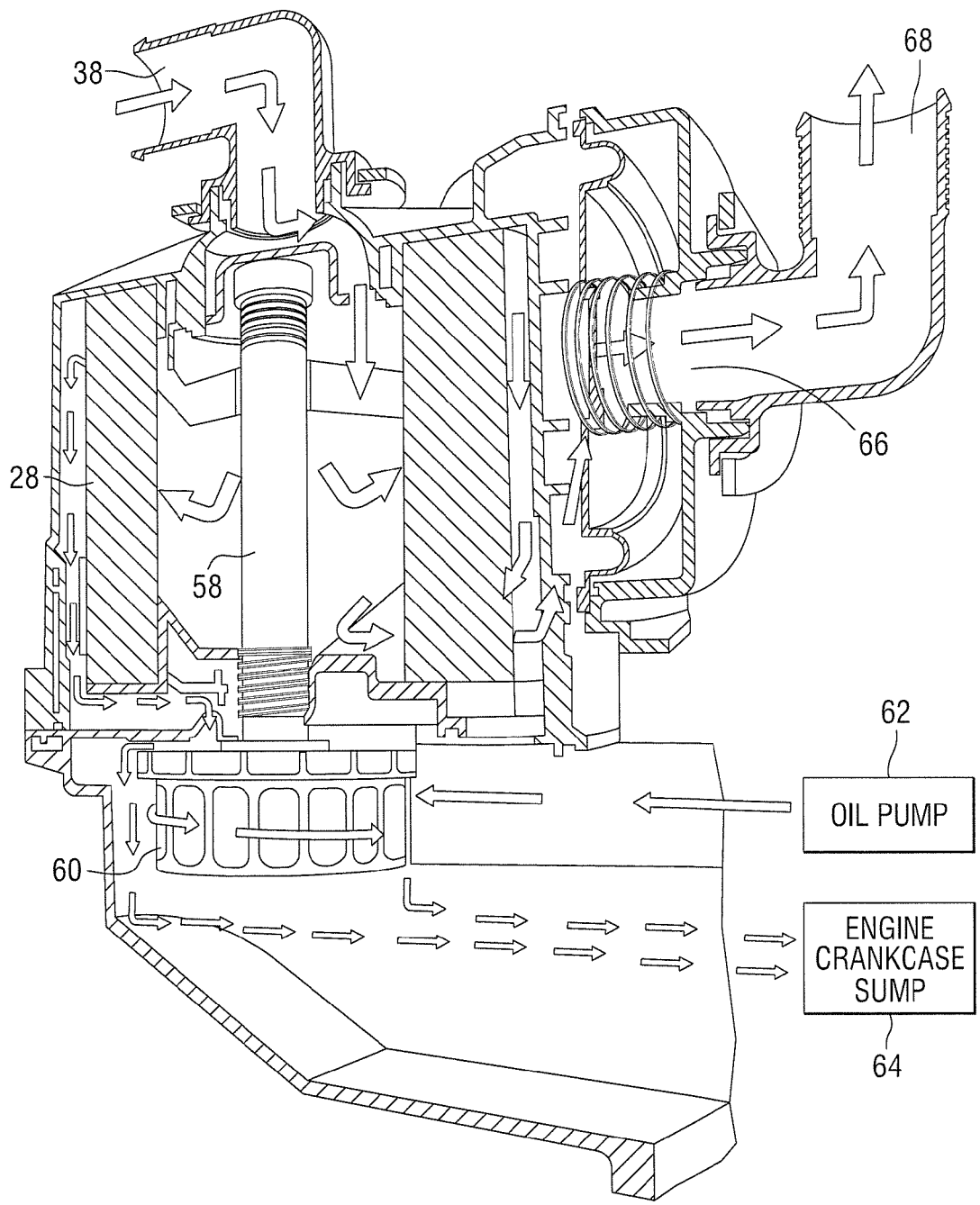
Figure 3:
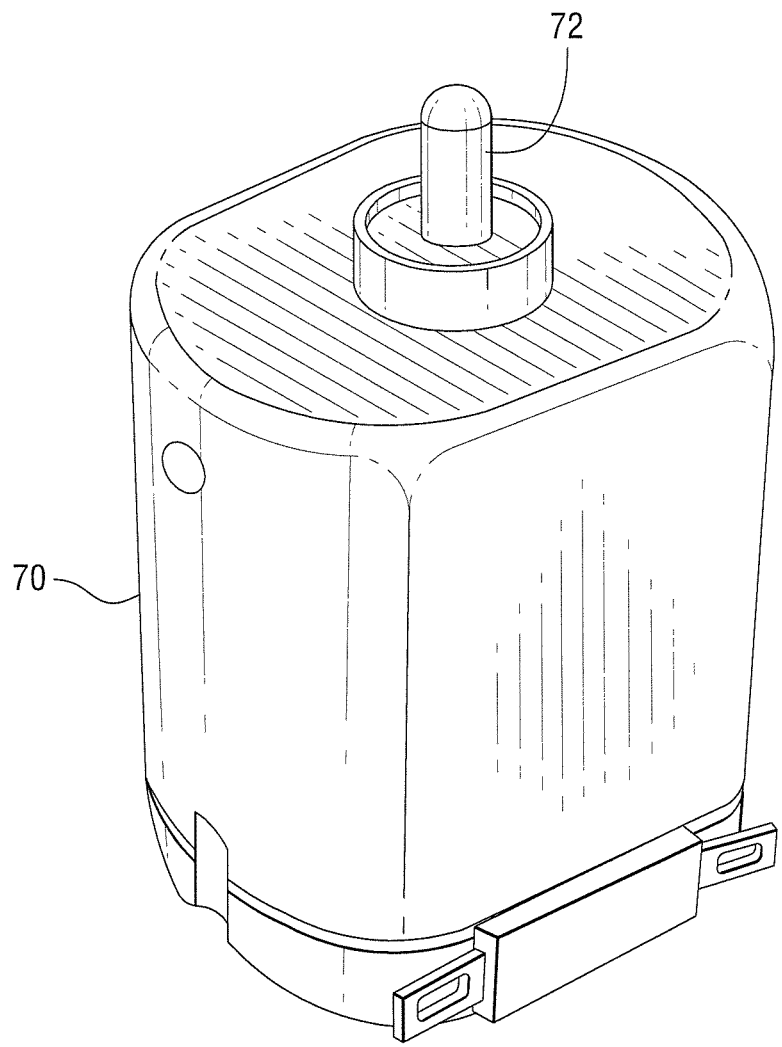
Figure 4:
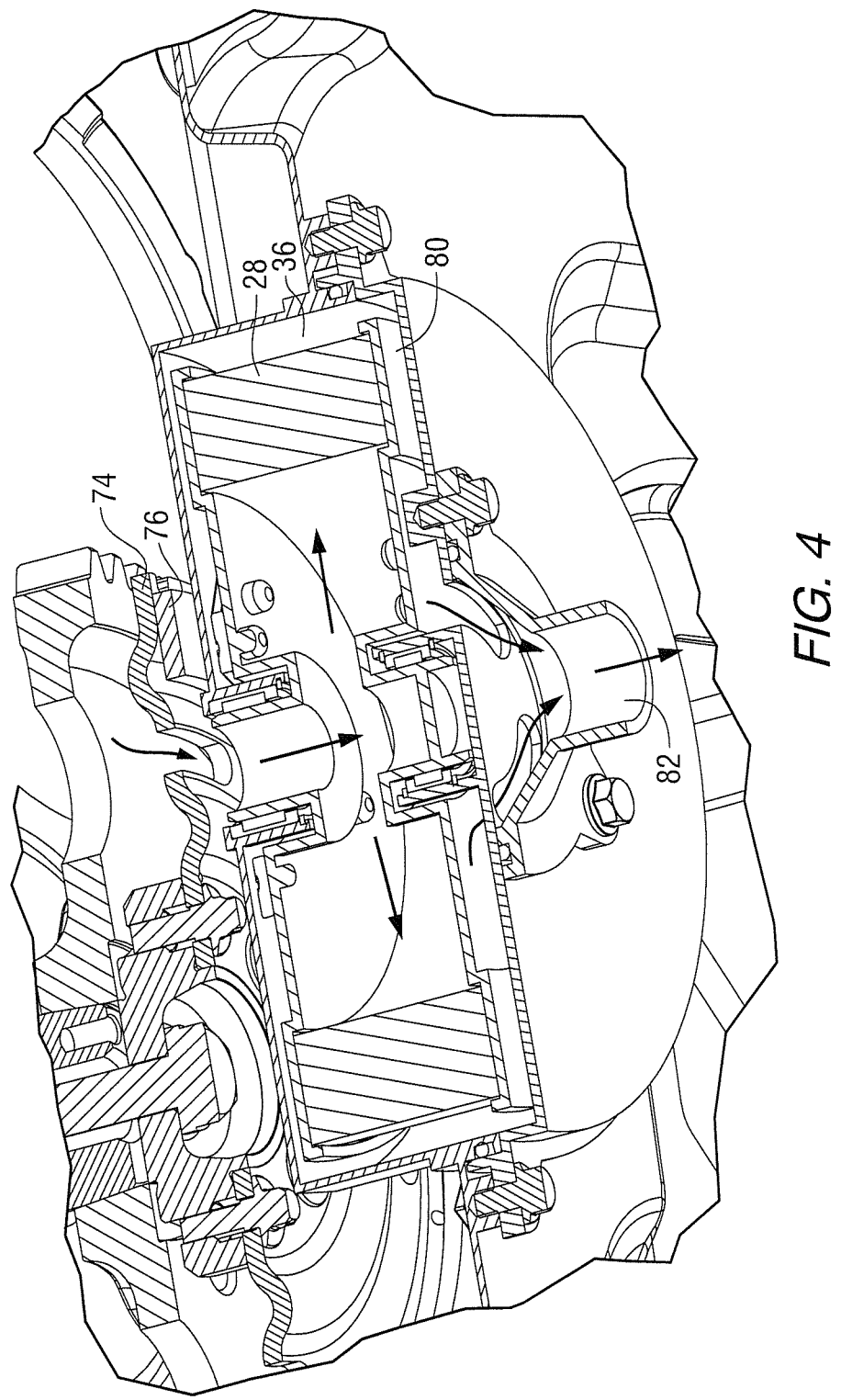
Figure 5:
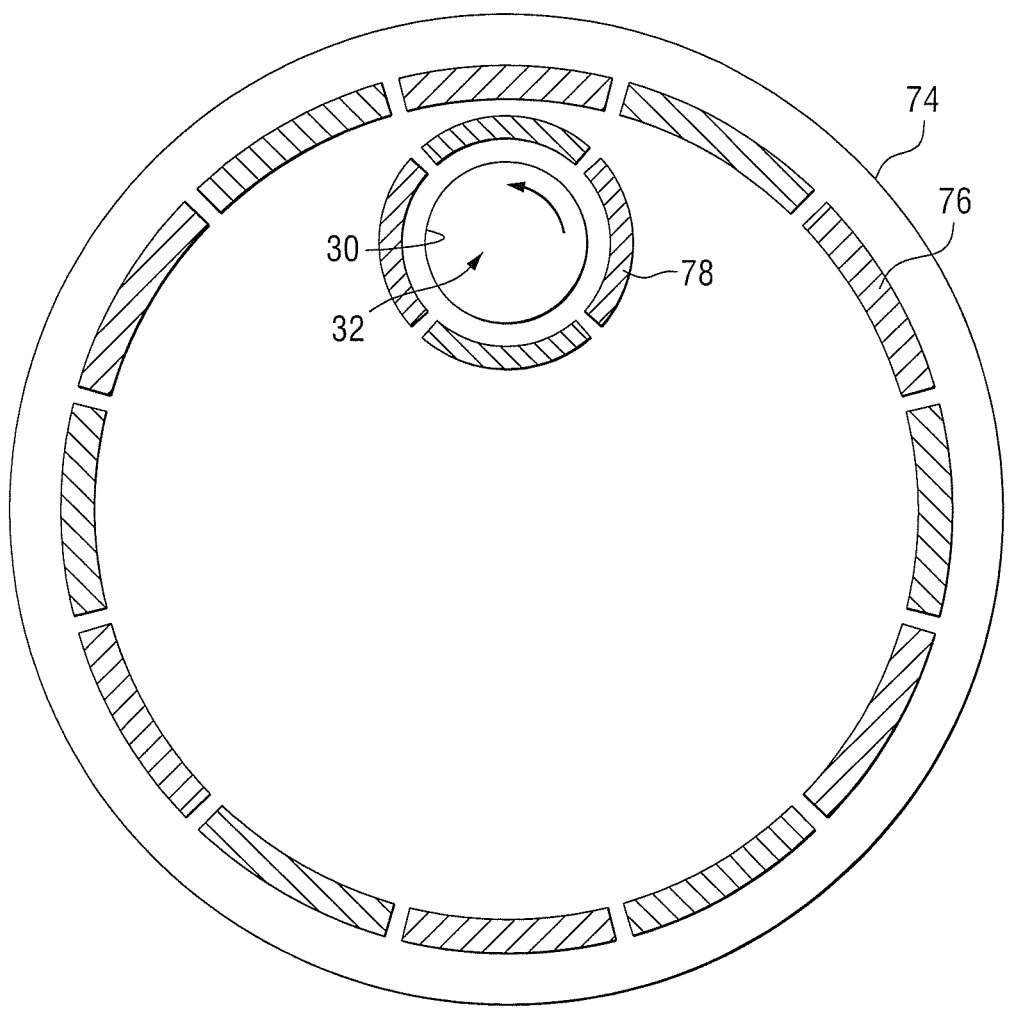

In one embodiment, coalescing filter element 28 is driven to rotate by a mechanical coupling to a component of the engine, e.g. axially extending shaft 58 connected to a gear or drive pulley of the engine. In another embodiment, coalescing filter element 28 is driven to rotate by a fluid motor, e.g. a pelton or turbine drive wheel 60, FIG. 2, driven by pumped pressurized oil from the engine oil pump 62 and returning same to engine crankcase sump 64. FIG. 2 uses like reference numerals from FIG. 1 where appropriate to facilitate understanding. Separated cleaned air is supplied through pressure responsive valve 66 to outlet 68 which is an alternate outlet to that shown at 42 in FIG. 1. In another embodiment, coalescing filter element 28 is driven to rotate by an electric motor 70, FIG. 3, having a drive output rotary shaft 72 coupled to shaft 58. In another embodiment, coalescing filter element 28 is driven to rotate by magnetic coupling to a component of the engine, FIGS. 4, 5. An engine driven rotating gear 74 has a plurality of magnets such as 76 spaced around the periphery thereof and magnetically coupling to a plurality of magnets 78 spaced around inner periphery 30 of the coalescing filter element such that as gear or driving wheel 74 rotates, magnets 76 move past, FIG. 5, and magnetically couple with magnets 78, to in turn rotate the coalescing filter element as a driven member. In FIG. 4, separated cleaned air flows from exterior zone 36 through channel 80 to outlet 82, which is an alternate cleaned air outlet to that shown at 42 in FIG. 1. The arrangement in FIG. 5 provides a gearing-up effect to rotate the coalescing filter assembly at a greater rotational speed (higher angular velocity) than driving gear or wheel 74, e.g. where it is desired to provide a higher rotational speed of the coalescing filter element.

Pressure drop across coalescing filter element 28 decreases with increasing rotational speed of the coalescing filter element. Oil saturation of coalescing filter element 28 decreases with increasing rotational speed of the coalescing filter element. Oil drains from outer periphery 34, and the amount of oil drained increases with increasing rotational speed of coalescing filter element 28. Oil particle settling velocity in coalescing filter element 28 acts in the same direction as the direction of air flow through the coalescing filter element. The noted same direction enhances capture and coalescence of oil particles by the coalescing filter element.

The system provides a method for separating air from oil in internal combustion engine crankcase ventilation blowby gas by introducing a G force in coalescing filter element 28 to cause increased gravitational settling in the coalescing filter element, to improve particle capture and coalescence of submicron oil particles by the coalescing filter element. The method includes providing an annular coalescing filter element 28, rotating the coalescing filter element, and providing inside-out flow through the rotating coalescing filter element.

The system provides a method for reducing crankcase pressure in an internal combustion engine crankcase generating blowby gas. The method includes providing a crankcase ventilation system including a coalescing filter element 28 separating oil from air in the blowby gas, providing the coalescing filter element as an annular element having a hollow interior 32, supplying the blowby gas to the hollow interior, and rotating the coalescing filter element to pump blowby gas out of crankcase 24 and into hollow interior 32 due to centrifugal force forcing the blowby gas to flow radially outwardly as shown at arrows 46 through coalescing filter element 28, which pumping effects reduced pressure in crankcase 24.

One type of internal combustion engine crankcase ventilation system provides open crankcase ventilation (OCV), wherein the cleaned air separated from the blowby gas is discharged to the atmosphere. Another type of internal combustion crankcase ventilation system involves closed crankcase ventilation (CCV), wherein the cleaned air separated from the blowby gas is returned to the engine, e.g. is returned to the combustion air intake system to be mixed with the incoming combustion air supplied to the engine.

Figure 6:
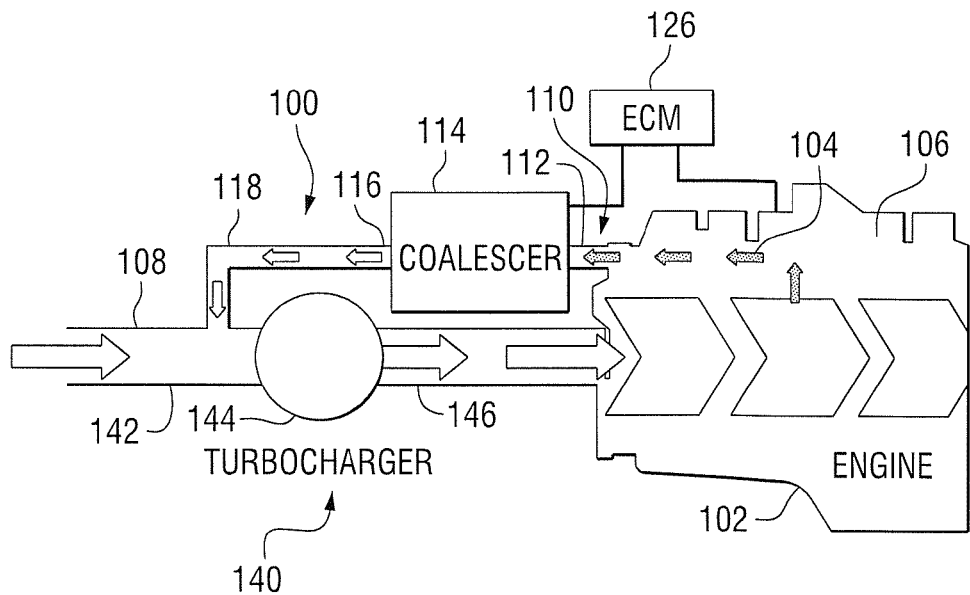
Figure 7:
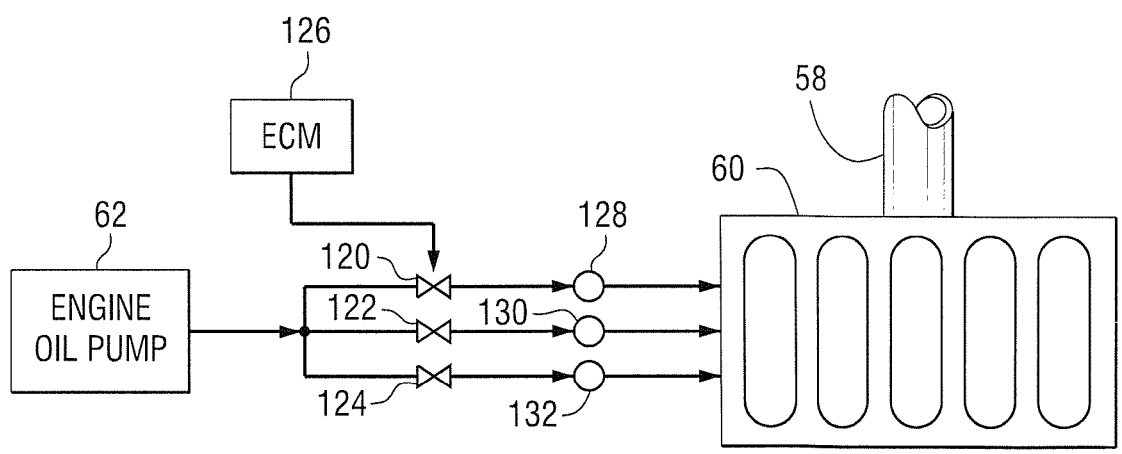

FIG. 6 shows a closed crankcase ventilation (CCV) system 100 for an internal combustion engine 102 generating blowby gas 104 in a crankcase 106. The system includes an air intake duct 108 supplying combustion air to the engine, and a return duct 110 having a first segment 112 supplying the blowby gas from the crankcase to air-oil coalescer 114 to clean the blowby gas by coalescing oil therefrom and outputting cleaned air at output 116, which may be outlet 42 of FIG. 1, 68 of FIG. 2, 82 of FIG. 4. Return duct 110 includes a second segment 118 supplying the cleaned air from coalescer 114 to air intake duct 108 to join the combustion air being supplied to the engine. Coalescer 114 is variably controlled according to a given condition of the engine, to be described.

Coalescer 114 has a variable efficiency variably controlled according to a given condition of the engine. In one embodiment, coalescer 114 is a rotating coalescer, as above, and the speed of rotation of the coalescer is varied according to the given condition of the engine. In one embodiment, the given condition is engine speed. In one embodiment, the coalescer is driven to rotate by an electric motor, e.g. 70, FIG. 3. In one embodiment, the electric motor is a variable speed electric motor to vary the speed of rotation of the coalescer. In another embodiment, the coalescer is hydraulically driven to rotate, e.g. FIG. 2. In one embodiment, the speed of rotation of the coalescer is hydraulically varied. In this embodiment, the engine oil pump 62, FIGS. 2, 7, supplies pressurized oil through a plurality of parallel shut-off valves such as 120, 122, 124 which are controlled between closed and open or partially open states by the electronic control module (ECM) 126 of the engine, for flow through respective parallel orifices or nozzles 128, 130, 132 to controllably increase or decrease the amount of pressurized oil supplied against pelton or turbine wheel 60, to in turn controllably vary the speed of rotation of shaft 58 and coalescing filter element 28.

In one embodiment, a turbocharger system 140, FIG. 6, is provided for the internal combustion engine 102 generating blowby gas 104 in crankcase 106. The system includes the noted air intake duct 108 having a first segment 142 supplying combustion air to a turbocharger 144, and a second segment 146 supplying turbocharged combustion air from turbocharger 144 to engine 102. Return duct 110 has the noted first segment 112 supplying the blowby gas 104 from crankcase 106 to air-oil coalescer 114 to clean the blowby gas by coalescing oil therefrom and outputting cleaned air at 116. The return duct has the noted second segment 118 supplying cleaned air from coalescer 114 to first segment 142 of air intake duct 108 to join combustion air supplied to turbocharger 144. Coalescer 114 is variably controlled according to a given condition of at least one of turbocharger 144 and engine 102. In one embodiment, the given condition is a condition of the turbocharger. In a further embodiment, the coalescer is a rotating coalescer, as above, and the speed of rotation of the coalescer is varied according to turbocharger efficiency. In a further embodiment, the speed of rotation of the coalescer is varied according to turbocharger boost pressure. In a further embodiment, the speed of rotation of the coalescer is varied according to turbocharger boost ratio, which is the ratio of pressure at the turbocharger outlet versus pressure at the turbocharger inlet. In a further embodiment, the coalescer is driven to rotate by an electric motor, e.g. 70, FIG. 3. In a further embodiment, the electric motor is a variable speed electric motor to vary the speed of rotation of the coalescer. In another embodiment, the coalescer is hydraulically driven to rotate, FIG. 2. In a further embodiment, the speed of rotation of the coalescer is hydraulically varied, FIG. 7.

The system provides a method for improving turbocharger efficiency in a turbocharger system 140 for an internal combustion engine 102 generating blowby gas 104 in a crankcase 106, the system having an air intake duct 108 having a first segment 142 supplying combustion air to a turbocharger 144, and a second segment 146 supplying turbocharged combustion air from the turbocharger 144 to the engine 102, and having a return duct 110 having a first segment 112 supplying the blowby gas 104 to air-oil coalescer 114 to clean the blowby gas by coalescing oil therefrom and outputting cleaned air at 116, the return duct having a second segment 118 supplying the cleaned air from the coalescer 114 to the first segment 142 of the air intake duct to join combustion air supplied to turbocharger 144. The method includes variably controlling coalescer 114 according to a given condition of at least one of turbocharger 144 and engine 102. One embodiment variably controls coalescer 114 according to a given condition of turbocharger 144. A further embodiment provides the coalescer as a rotating coalescer, as above, and varies the speed of rotation of the coalescer according to turbocharger efficiency. A further method varies the speed of rotation of coalescer 114 according to turbocharger boost pressure. A further embodiment varies the speed of rotation of coalescer 114 according to turbocharger boost ratio, which is the ratio of pressure at the turbocharger outlet versus pressure at the turbocharger inlet.

Figure 8:
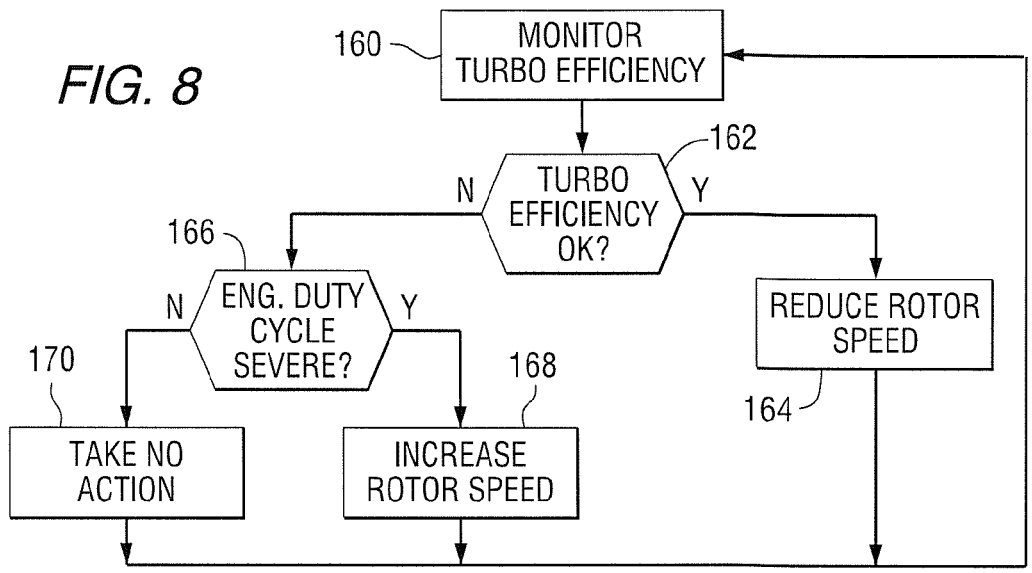

FIG. 8 shows a control scheme for CCV implementation. At step 160, turbocharger efficiency is monitored, and if the turbo efficiency is ok as determined at step 162, then rotor speed of the coalescing filter element is reduced at step 164. If the turbocharger efficiency is not ok, then engine duty cycle is checked at step 166, and if the engine duty cycle is severe then rotor speed is increased at step 168, and if engine duty cycle is not severe then no action is taken as shown at step 170.

Figure 9:
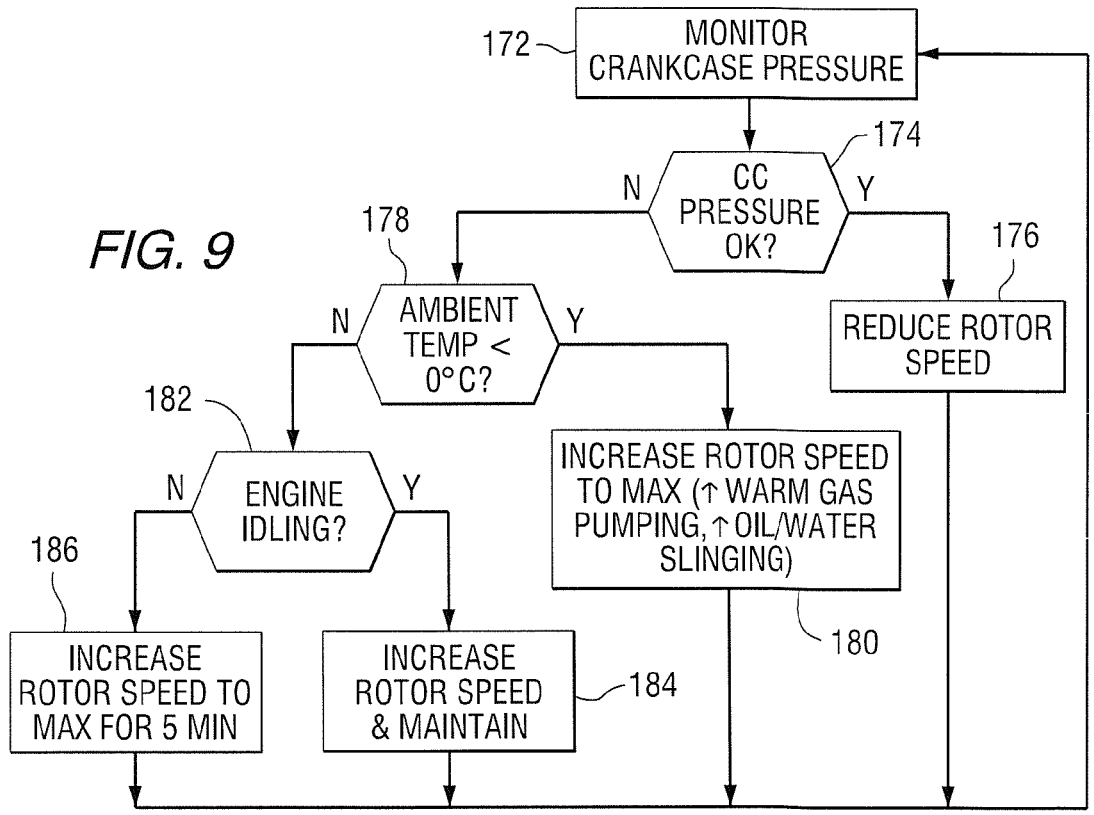

FIG. 9 shows a control scheme for OCV implementation. Crankcase pressure is monitored at step 172, and if it is ok as determined at step 174 then rotor speed is reduced at step 176, and if not ok then ambient temperature is checked at step 178 and if less than 0° C., then at step 180 rotor speed is increased to a maximum to increase warm gas pumping and increase oil-water slinging. If ambient temperature is not less than 0° C., then engine idling is checked at step 182, and if the engine is idling then at step 184 rotor speed is increased and maintained, and if the engine is not idling, then at step 186 rotor speed is increased to a maximum for five minutes.

Figure 10:
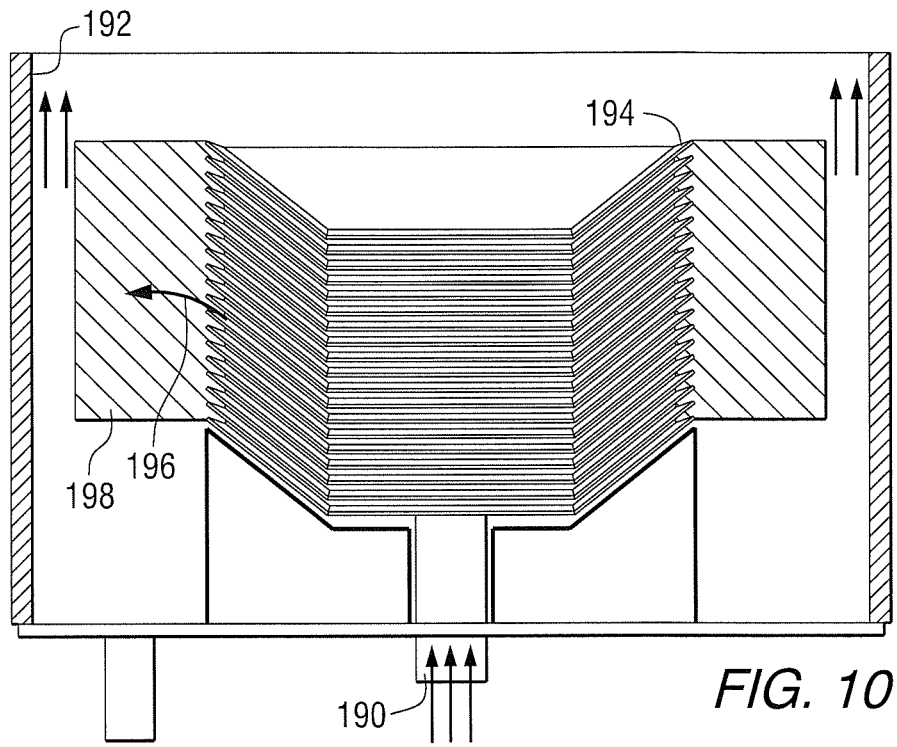
Figure 11:
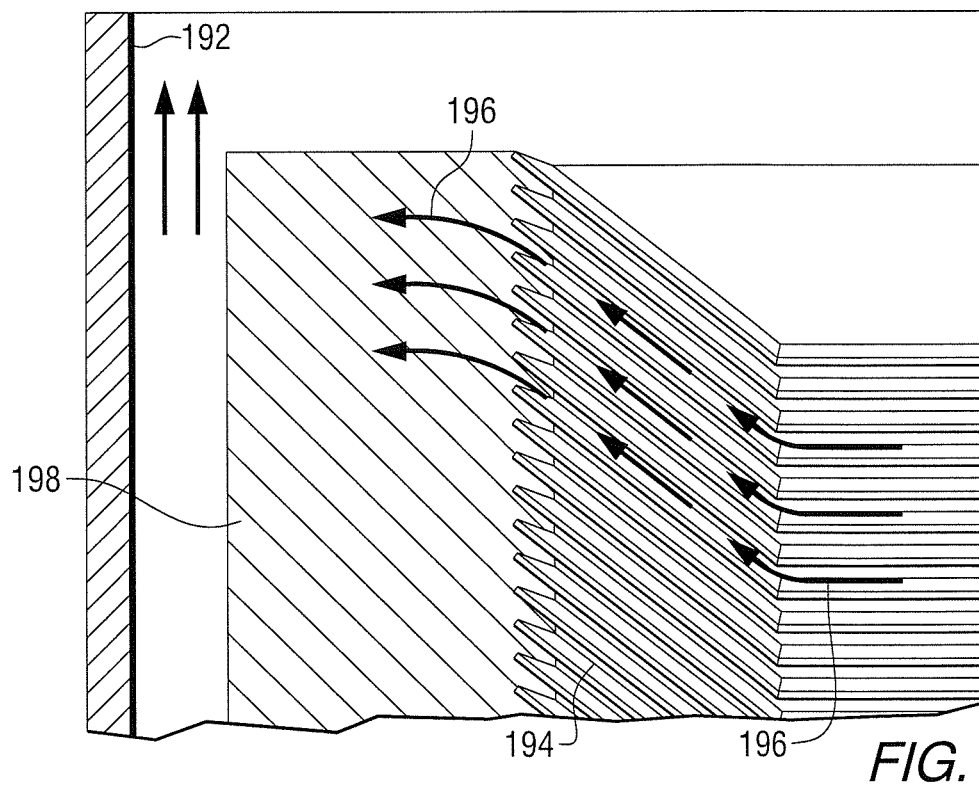
Figure 12:
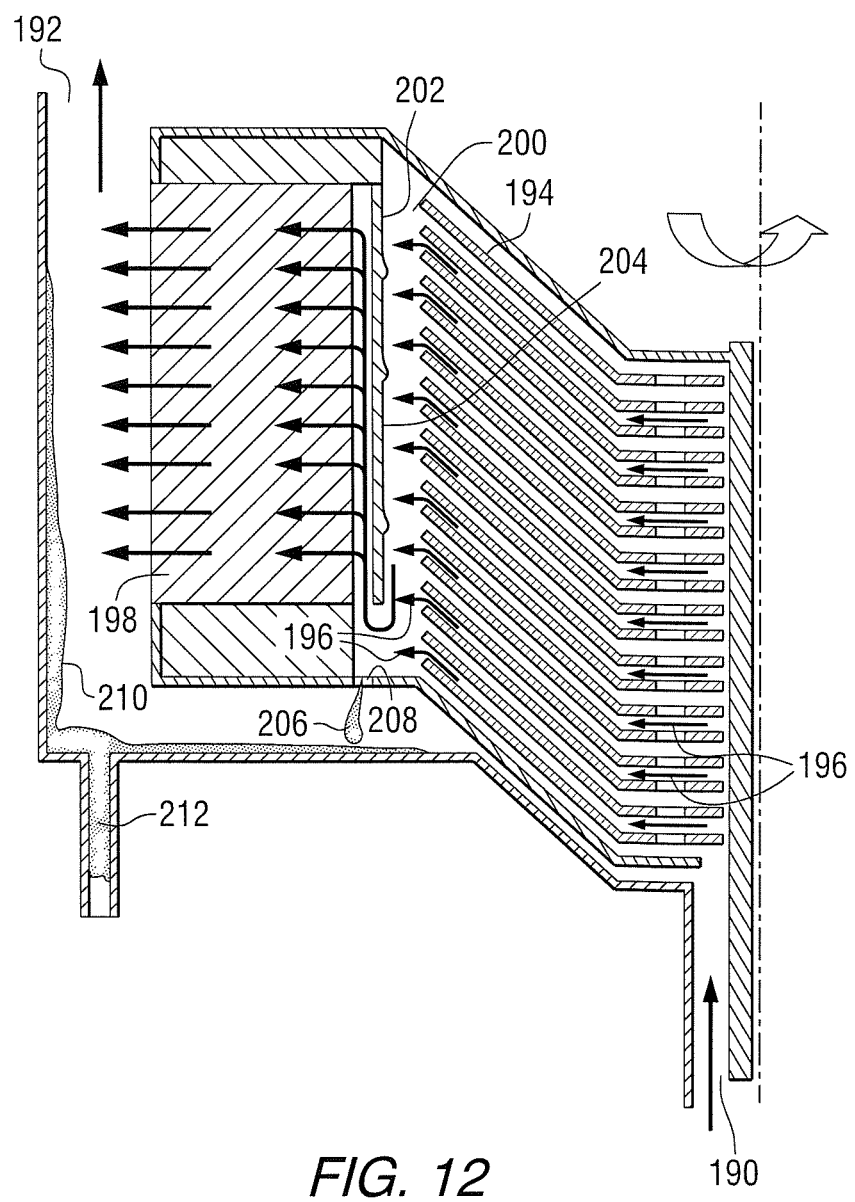

The flow path through the coalescing filter assembly is from upstream to downstream, e.g. in FIG. 1 from inlet port 38 to outlet port 42, e.g. in FIG. 2 from inlet port 38 to outlet port 68, e.g. in FIG. 10 from inlet port 190 to outlet port 192. There is further provided in FIG. 10 in combination a rotary cone stack separator 194 located in the flow path and separating air from oil in the blowby gas. Cone stack separators are known in the prior art. The direction of blowby gas flow through the rotating cone stack separator is inside-out, as shown at arrows 196, FIGS. 10-12. Rotating cone stack separator 194 is upstream of rotating coalescer filter element 198. Rotating cone stack separator 194 is in hollow interior 200 of rotating coalescer filter element 198. In FIG. 12, an annular shroud 202 is provided in hollow interior 200 and is located radially between rotating cone stack separator 194 and rotating coalescer filter element 198 such that shroud 202 is downstream of rotating cone stack separator 194 and upstream of rotating coalescer filter element 198 and such that shroud 202 provides a collection and drain surface 204 along which separated oil drains after separation by the rotating cone stack separator, which oil drains as shown at droplet 206 through drain hole 208, which oil then joins the oil separated by coalescer 198 as shown at 210 and drains through main drain 212.

Figure 13:
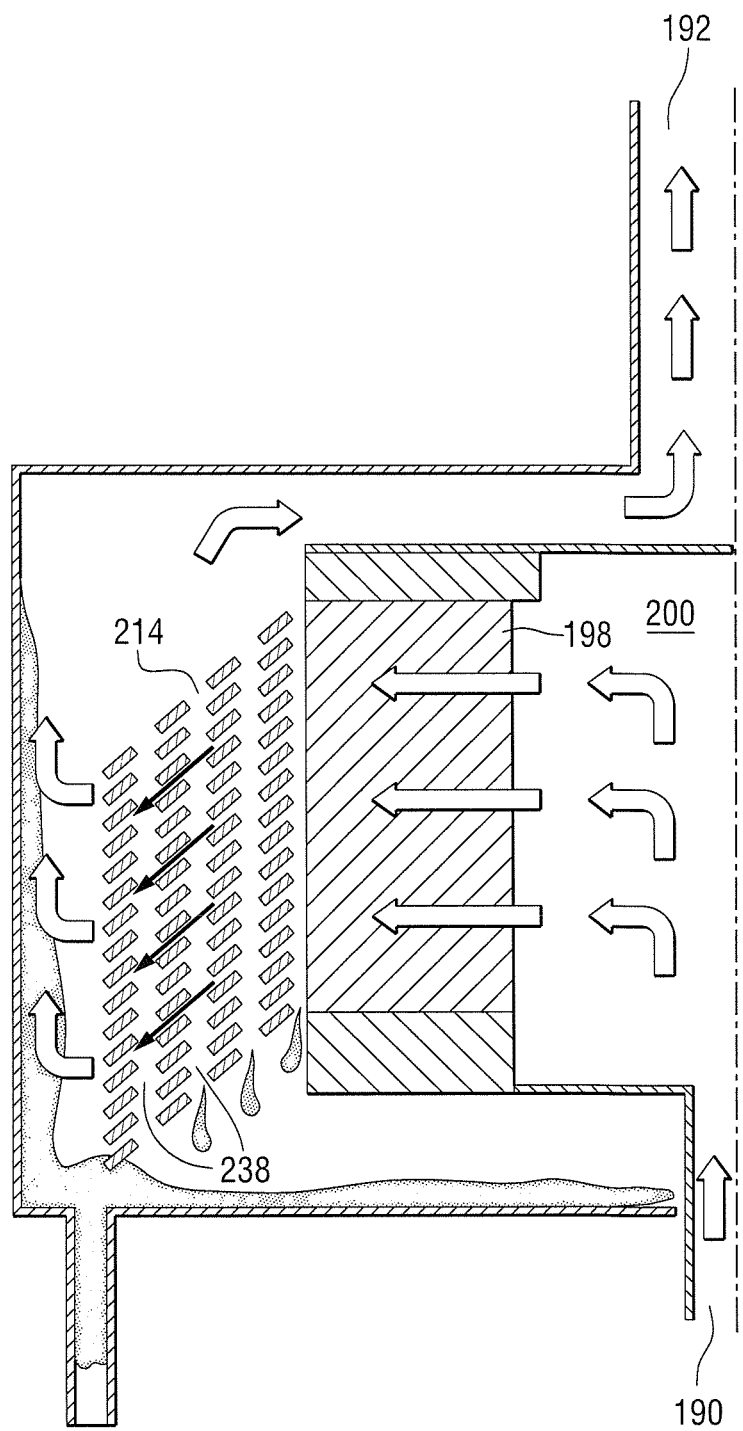

FIG. 13 shows a further embodiment and uses like reference numerals from above where appropriate to facilitate understanding. Rotating cone stack separator 214 is downstream of rotating coalescer filter element 198. The direction of flow through rotating cone stack separator 214 is inside-out. Rotating cone stack separator 214 is located radially outwardly of and circumscribes rotating coalescer filter element 198.

FIG. 14 shows another embodiment and uses like reference numerals from above where appropriate to facilitate understanding. Rotating cone stack separator 216 is downstream of rotating coalescer filter element 198. The direction of flow through rotating cone stack separator 216 is outside-in, as shown at arrows 218. Rotating coalescer filter element 198 and rotating cone stack separator 216 rotate about a common axis 220 and are axially adjacent each other. Blowby gas flows radially outwardly through rotating coalescer filter element 198 as shown at arrows 222 then axially as shown at arrows 224 to rotating cone stack separator 216 then radially inwardly as shown at arrows 218 through rotating cone stack separator 216.

Figure 15:
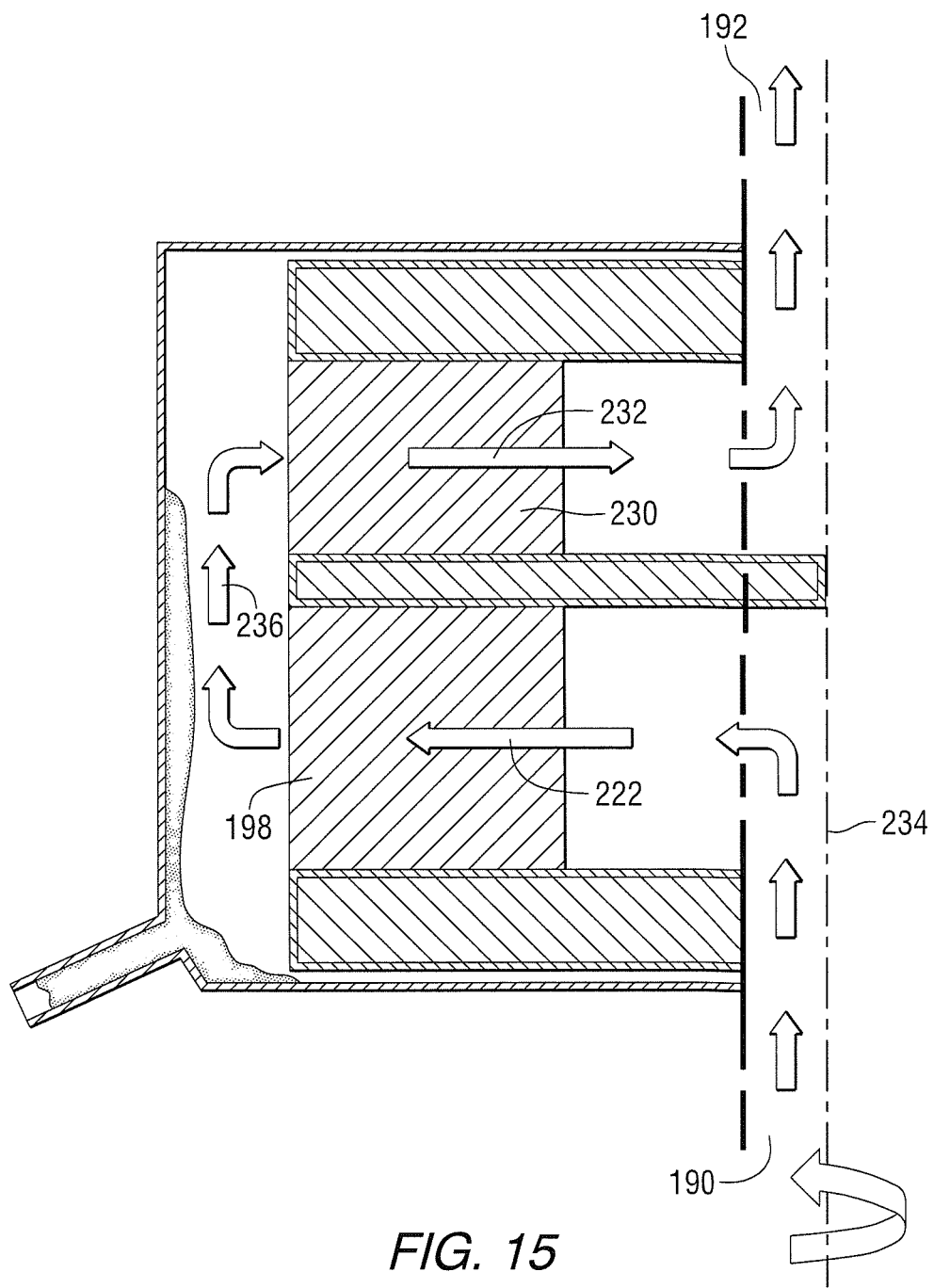

FIG. 15 shows another embodiment and uses like reference numerals from above where appropriate to facilitate understanding. A second annular rotating coalescer filter element 230 is provided in the noted flow path from inlet 190 to outlet 192 and separates air from oil in the blowby gas. The direction of flow through second rotating coalescer filter element 230 is outside-in as shown at arrow 232. Second rotating coalescer filter element 230 is downstream of first rotating coalescer filter element 198. First and second rotating coalescer filter elements 198 and 230 rotate about a common axis 234 and are axially adjacent each other. Blowby gas flows radially outwardly as shown at arrow 222 through first rotating coalescer filter element 198 then axially as shown at arrow 236 to second rotating coalescer filter element 230 then radially inwardly as shown at arrow 232 through second rotating coalescer filter element 230.

In various embodiments, the rotating cone stack separator may be perforated with a plurality of drain holes, e.g. 238, FIG. 13, allowing drainage therethrough of separated oil.

Figure 16:
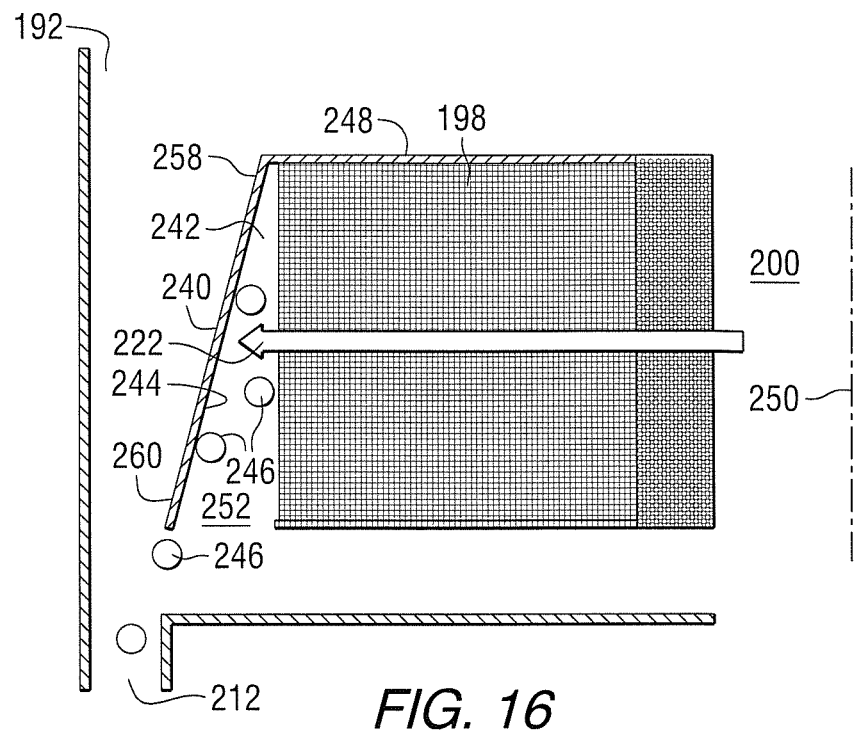
Figure 17:
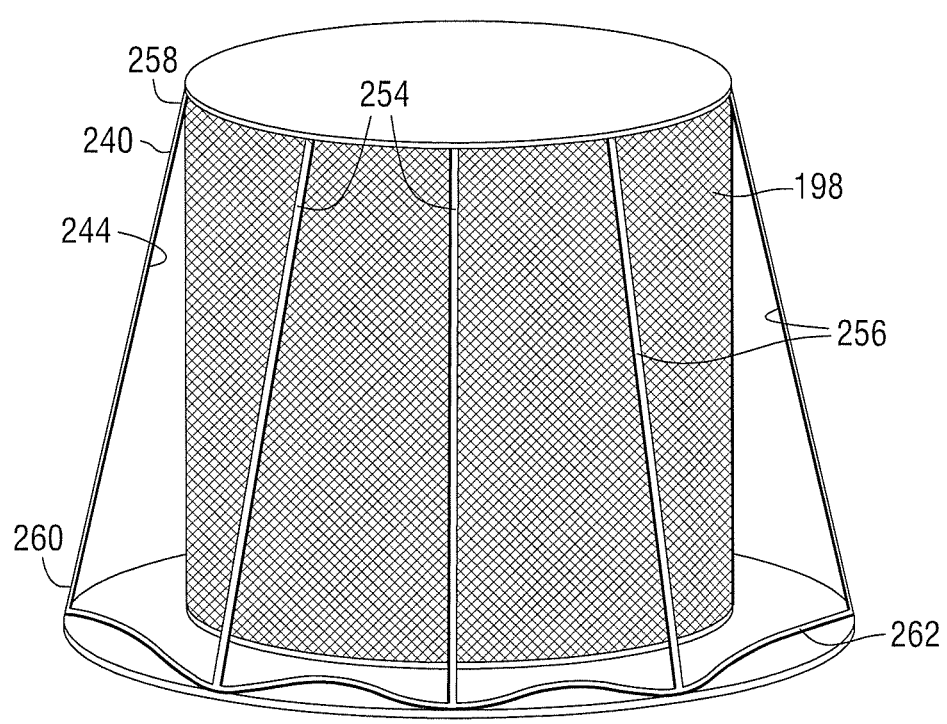

FIG. 16 shows another embodiment and uses like reference numerals from above where appropriate to facilitate understanding. An annular shroud 240 is provided along the exterior 242 of rotating coalescer filter element 198 and radially outwardly thereof and downstream thereof such that shroud 240 provides a collection and drain surface 244 along which separated oil drains as shown at droplets 246 after coalescence by rotating coalescer filter element 198. Shroud 240 is a rotating shroud and may be part of the filter frame or end cap 248. Shroud 240 circumscribes rotating coalescer filter element 198 and rotates about a common axis 250 therewith. Shroud 240 is conical and tapers along a conical taper relative to the noted axis. Shroud 240 has an inner surface at 244 radially facing rotating coalescer filter element 198 and spaced therefrom by a radial gap 252 which increases as the shroud extends axially downwardly and along the noted conical taper. Inner surface 244 may have ribs such as 254, FIG. 17, circumferentially spaced therearound and extending axially and along the noted conical taper and facing rotating coalescer filter element 198 and providing channeled drain paths such as 256 therealong guiding and draining separated oil flow therealong. Inner surface 244 extends axially downwardly along the noted conical taper from a first upper axial end 258 to a second lower axial end 260. Second axial end 260 is radially spaced from rotating coalescer filter element 198 by a radial gap greater than the radial spacing of first axial end 258 from rotating coalescer filter element 198. In a further embodiment, second axial end 260 has a scalloped lower edge 262, also focusing and guiding oil drainage.

Figure 18:
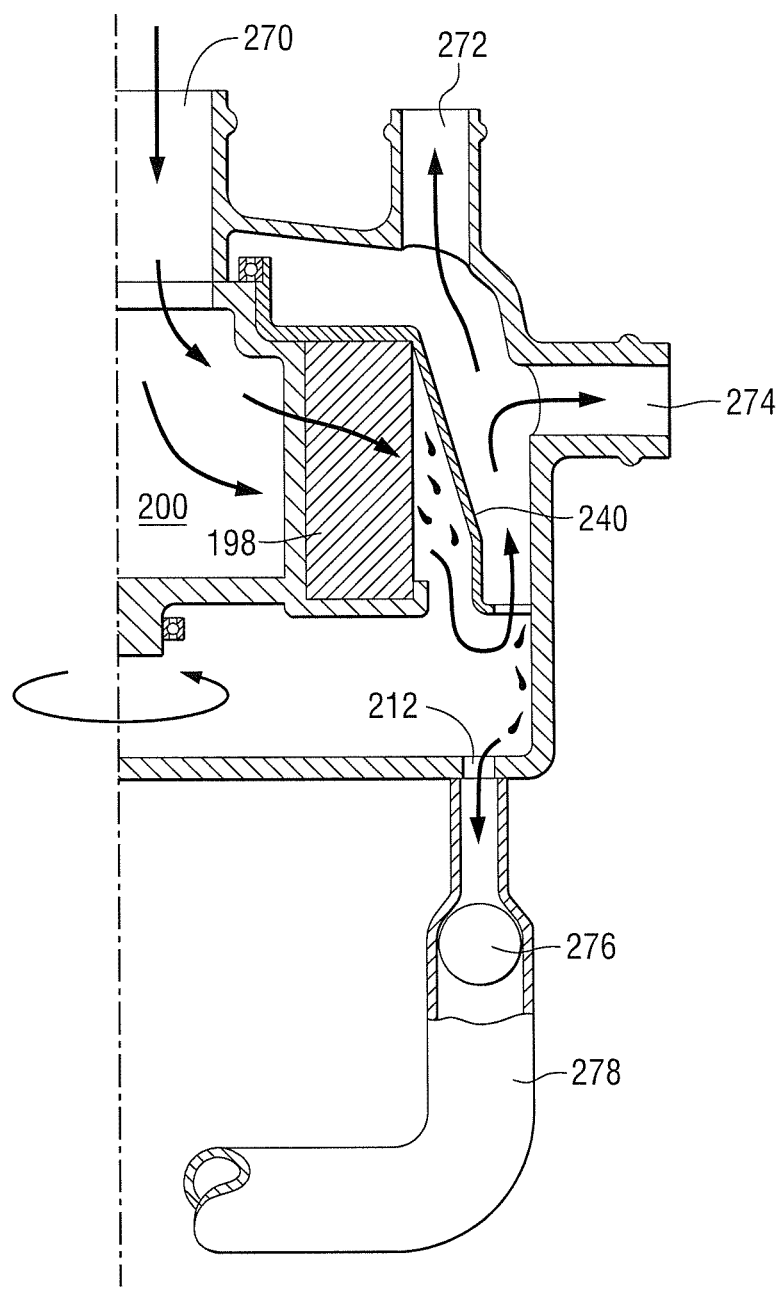

FIG. 18 shows a further embodiment and uses like reference numerals from above where appropriate to facilitate understanding. In lieu of lower inlet 190, FIGS. 13-15, an upper inlet port 270 is provided, and a pair of possible or alternate outlet ports are shown at 272 and 274. Oil drainage through drain 212 may be provided through a one-way check valve such as 276 to drain hose 278, for return to the engine crankcase, as above.

Figure 19:
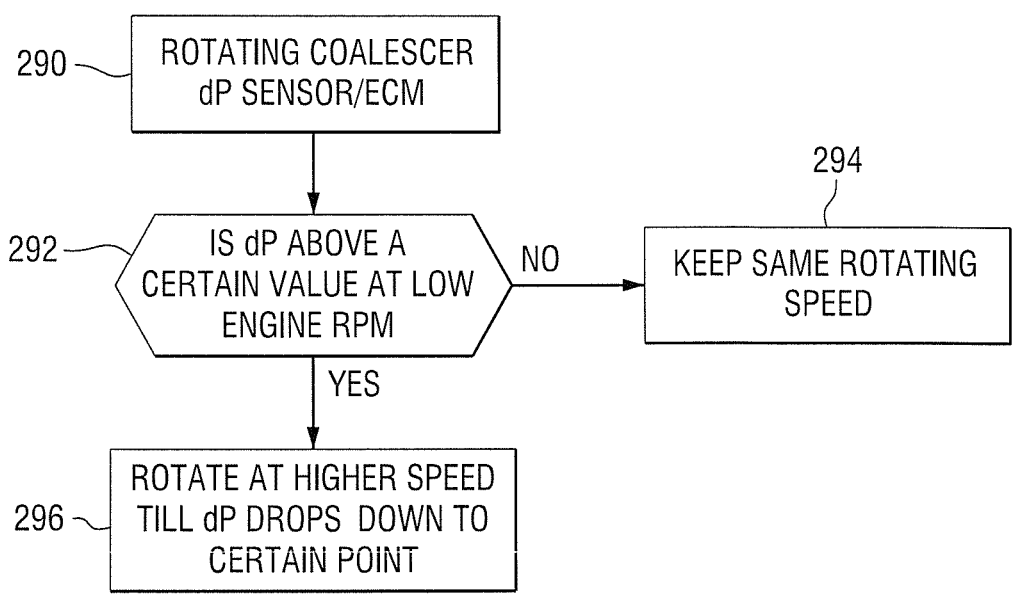

As above noted, the coalescer can be variably controlled according to a given condition, which may be a given condition of at least one of the engine, the turbocharger, and the coalescer. In one embodiment, the noted given condition is a given condition of the engine, as above noted. In another embodiment, the given condition is a given condition of the turbocharger, as above noted. In another embodiment, the given condition is a given condition of the coalescer. In a version of this embodiment, the noted given condition is pressure drop across the coalescer. In a version of this embodiment, the coalescer is a rotating coalescer, as above, and is driven at higher rotational speed when pressure drop across the coalescer is above a predetermined threshold, to prevent accumulation of oil on the coalescer, e.g. along the inner periphery thereof in the noted hollow interior, and to lower the noted pressure drop. FIG. 19 shows a control scheme wherein the pressure drop, dP, across the rotating coalescer is sensed, and monitored by the ECM (engine control module), at step 290, and then it is determined at step 292 whether dP is above a certain value at low engine RPM, and if not, then rotational speed of the coalescer is kept the same at step 294, and if dP is above a certain value then the coalescer is rotated at a higher speed at step 296 until dP drops down to a certain point. The noted given condition is pressure drop across the coalescer, and the noted predetermined threshold is a predetermined pressure drop threshold.

Figure 20:
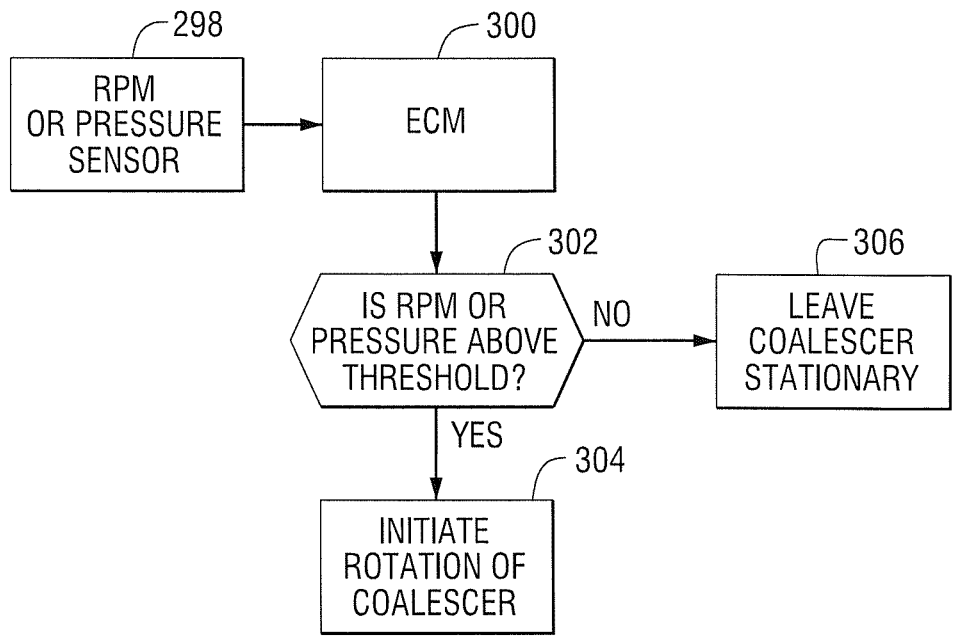
Figure 21:
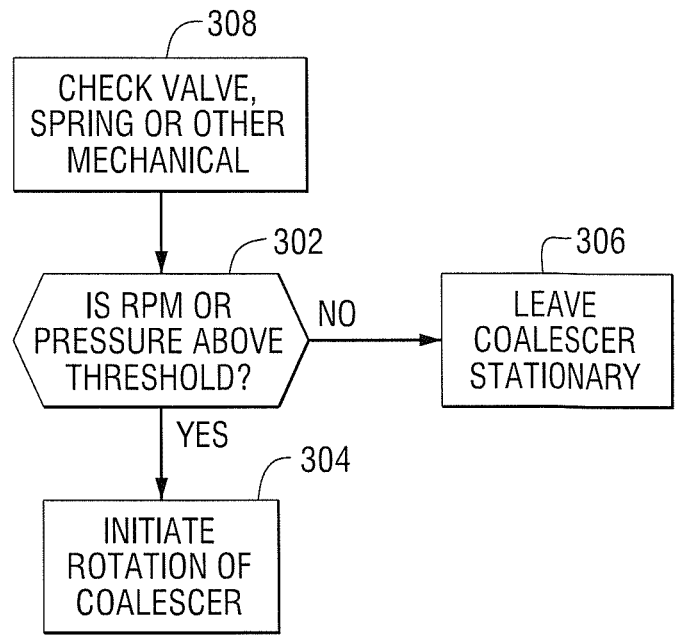

In a further embodiment, the coalescer is an intermittently rotating coalescer having two modes of operation, and is in a first stationary mode when a given condition is below a predetermined threshold, and is in a second rotating mode when the given condition is above the predetermined threshold, with hysteresis if desired. The first stationary mode provides energy efficiency and reduction of parasitic energy loss. The second rotating mode provides enhanced separation efficiency removing oil from the air in the blowby gas. In one embodiment, the given condition is engine speed, and the predetermined threshold is a predetermined engine speed threshold. In another embodiment, the given condition is pressure drop across the coalescer, and the predetermined threshold is a predetermined pressure drop threshold. In another embodiment, the given condition is turbocharger efficiency, and the predetermined threshold is a predetermined turbocharger efficiency threshold. In a further version, the given condition is turbocharger boost pressure, and the predetermined threshold is a predetermined turbocharger boost pressure threshold. In a further version, the given condition is turbocharger boost ratio, and the predetermined threshold is a predetermined turbocharger boost ratio threshold, where, as above noted, turbocharger boost ratio is the ratio of pressure at the turbocharger outlet vs. pressure at the turbocharger inlet. FIG. 20 shows a control scheme for an electrical version wherein engine RPM or coalescer pressure drop is sensed at step 298 and monitored by the ECM at step 300 and then at step 302 if the RPM or pressure is above a threshold then rotation of the coalescer is initiated at step 304, and if the RPM or pressure is not above the threshold then the coalescer is left in the stationary mode at step 306. FIG. 21 shows a mechanical version and uses like reference numerals from above where appropriate to facilitate understanding. A check valve, spring or other mechanical component at step 308 senses RPM or pressure and the decision process is carried out at steps 302, 304, 306 as above.

The noted method for improving turbocharger efficiency includes variably controlling the coalescer according to a given condition of at least one of the turbocharger, the engine, and the coalescer. One embodiment variably controls the coalescer according to a given condition of the turbocharger. In one version, the coalescer is provided as a rotating coalescer, and the method includes varying the speed of rotation of the coalescer according to turbocharger efficiency, and in another embodiment according to turbocharger boost pressure, and in another embodiment according to turbocharger boost ratio, as above noted. A further embodiment variably controls the coalescer according to a given condition of the engine, and in a further embodiment according to engine speed. In a further version, the coalescer is provided as a rotating coalescer, and the method involves varying the speed of rotation of the coalescer according to engine speed. A further embodiment variably controls the coalescer according to a given condition of the coalescer, and in a further version according to pressure drop across the coalescer. In a further version, the coalescer is provided as a rotating coalescer, and the method involves varying the speed of rotation of the coalescer according to pressure drop across the coalescer. A further embodiment involves intermittently rotating the coalescer to have two modes of operation including a first stationary mode and a second rotating mode, as above.

Further development in the above technology including a magnetically driven rotating separator and a rotating coalescer with keyed drive are provided in commonly owned co-pending U.S. patent application Ser. No. 13/167,814, filed Jun. 24, 2011, and U.S. patent application Ser. No. 13/167, 820, filed Jun. 24, 2011, all incorporated herein by reference.

Present Application

FIG. 22 shows a rotating separator 320 for separating liquid from a fluid mixture. The separator assembly 322 includes a housing 324, and an annular rotating separating filter element 326, like element 28 above, rotating about an axis 328 extending along an axial direction (into the page in FIG. 22) in the housing. Annular rotating separating filter element 326 has an inner periphery 330 defining a hollow interior 332, and has an outer periphery 334. The housing has a sidewall 336 with an inner surface 338 facing outer periphery 334 of annular rotating separating filter element 326 and spaced along a radial direction 340 radially outwardly of the annular rotating separating filter element by a plenum 342 therebetween. The housing has an inlet such as 38 in FIG. 1 for supplying the fluid mixture to hollow interior 332, comparably as shown at arrows 40 in FIG. 1 supplying the mixture to hollow interior 32. The housing has an outlet such as 42 in FIG. 1 delivering a separated component of the mixture from plenum 342, comparably as shown at arrows 44 in FIG. 1 from plenum 36. The housing has a drain such as 54 in FIG. 1 delivering separated liquid from the plenum, comparably as shown at arrows 50, 52 in FIG. 1. The direction of flow through the annular rotating separating filter element is inside-out as shown at arrow 340 from hollow interior 332 through annular rotating separating filter element 326 to plenum 342. Separating filter element 326 is rotated for example by axially extending shaft 58 as in FIG. 1 or other suitable drive mechanism including as noted above. The structure described thus far is as noted above.

In the present disclosure, the noted plenum has one or more flow path separating guides 350 minimizing the flow of separated liquid to the outlet, and guiding the separated liquid toward the drain. In one embodiment, the one or more flow path separating guides are provided by one or more fins 352, FIG. 23, extending into plenum 342 from inner surface 338 of the sidewall 336 of the housing. The fins are arcuately spaced from each other along inner surface 338 of sidewall 336 of the housing. The fins create capture grooves 354 catching the liquid, as shown at coalesced liquid droplets 356. The fins are tilted or slanted into the flow path of liquid exiting from annular rotating separating filter element 326, whose direction of rotation is shown at arrow 358. The tangential swirl flow of the liquid is shown at arrows 360, and the centrifugal flung-out flow of the liquid into capture grooves 354 is shown at arrows 362. Each fin extends from a root end 364 at inner surface 338 of sidewall 336 of the housing to a distal tip end 366 in plenum 342 pointing in a direction opposite to the direction of rotation 358 of annular rotating separating filter element 326 such that fins 352 and inner surface 338 of sidewall 336 of the housing form wedge-shape cavity 354 catching separated liquid 356. Fins 352 extend obliquely relative to radial direction 340.

In one embodiment, FIG. 24, the drain 370 is provided at a lower portion 372 of plenum 342, and the outlet 374 is provided at an upper portion 376 of plenum 342. In this embodiment, the inlet 378 is provided at the bottom of hollow interior 332 of annular rotating separating filter element 326. In another embodiment, the inlet, outlet and drain are provided as shown described above with respect to FIGS. 1-23.

Fins 352 define one or more guide surfaces guiding separating liquid along a drain direction toward the drain. In one embodiment, the drain direction is normal to radial direction 340. In another embodiment, the drain direction is also tangential to radial direction 340. In one embodiment, fins 352 wind helically downwardly toward the drain, for example as shown in FIG. 25 with a plurality of closely vertically spaced fins 380 forming capture grooves 382 therebetween and helically winding downwardly around the inner circumference of inner surface 338 of the housing sidewall, to guide the captured coalesced liquid droplets 356 in a spiral pattern downwardly to the bottom of plenum 342 at lower portion 372 to drain at drain 370. FIG. 26 shows another helical pattern for fins 384 on inner surface 338 of housing sidewall 336, which fins 384 have greater vertical spacing than in FIG. 25 and provide ledges or ramps 386 for the liquid to flow spirally downwardly therealong to lower portion 372 of plenum 342. In a further embodiment, FIG. 27, helically wound fins 384 have one or more axially extending slots 388 formed therethrough for gravitational drainage of separated liquid through the respective slot. The fins 352 of FIG. 23 may wind helically along inner surface 338 of sidewall 336, or may extend axially downwardly therealong in rectilinear manner, or may have other curved configuration to guide and aid drainage of separated liquid therealong.

In one embodiment, the sidewall of the housing tapers away from the axis of rotation 328, for example as shown in FIG. 28 at tapering housing sidewall 336a. Sidewall 336a tapers away from annular rotating separating filter element 326 as sidewall 336a extends away from upper portion 376 of plenum 342 and toward lower portion 372 of plenum 342. The one or more flow path guides provided by the noted fins create greater swirl in the plenum closer to upper portion 376 of the plenum and lesser swirl in the plenum closer to lower portion 372 of the plenum, to aid drainage of separated liquid toward lower portion 372 and away from upper portion 376, and less entrainment of separated liquid in the swirl. As the separated liquid flows helically downwardly along the fins, for example fins 384 of FIG. 26, the cumulative liquid flow and volume of fluid is greater at the lower portion 372 of the plenum than at the upper portion 376, and hence it may be desired to lessen swirl velocity at the lower portion 372 of the plenum to reduce entrainment of the greater volume of liquid available thereat as such liquid flows helically downwardly along the fins. Typical rotational speed of annular rotating separating filter element 326 may be approximately 3,000 rpm, thus resulting in significant tangential velocity of the outer periphery 334 of the annular rotating separating filter element 326 and concordant exit swirl velocity of coalesced liquid droplets 356 as they leave outer periphery 334 and enter plenum 342, as well as the swirl velocity of the remaining component or components of the mixture, such as air in the above noted crankcase ventilation separator, thus also causing significant air swirl velocity, which swirl may re-entrain the separated liquid. The outward tapering of sidewall 336a provides greater plenum volume at lower portion 372, and thus reduced swirl velocity.

In another embodiment, the noted one or more flow path separating guides are configured to create a tortuous path in plenum 342. In one embodiment, the one or more flow path separating guides are provided by one or more swirl flow dampers such as 390, FIG. 29, in the plenum. Swirl flow damper 390 is at upper portion 376 of plenum 342. In one embodiment, a plurality of swirl flow dampers such as 390 are provided in plenum 342. In one embodiment, the swirl flow damper is adjacent inner surface 338 of sidewall 336 of the housing. In one embodiment, the swirl flow damper is upstream of outlet 374. In one embodiment, swirl flow damper 390 is a vortex tube. In one embodiment, the one or more flow path separating guides are configured to break down secondary flow in plenum 342, and create low shear recirculation zones such as 392, FIG. 25, 394, FIG. 29, for collection of separated liquid.

In further embodiments, the one or more flow path separating guides, e.g. fins 352, 380, 384, are liquid-phobic, i.e. liquid-repelling, to aid drainage therealong of the separated liquid. In one embodiment, for use in an internal combustion engine crankcase ventilation separator, the noted one or more flow path separating guides, e.g. the fins, are oleophobic.

In another embodiment, the noted one more flow path guides are provided by a configured inner surface 338a, FIG. 30, of sidewall 336 of the housing. In one embodiment, a media layer 396 provides the noted configured inner surface of sidewall 336 of the housing. In one embodiment, media layer 396 includes at least fibrous media layer. In one embodiment, media layer 396 includes at least one non-woven fibrous media layer. In one embodiment, media layer 396 includes at least one woven screen. In one embodiment, media layer 396 includes at least one wire mesh layer. In one embodiment, media layer 396 includes a restrictive wrap. In one embodiment, the noted configured inner surface of the sidewall of the housing is liquid-philic, i.e. liquid-attractive. This may be desired in embodiments with or without fins 352, 380, 384, or swirl flow damper 390, where it is desired to retain the separated liquid at the inner surface of sidewall 336 of the housing and minimize re-entrainment in the swirl therepast. The liquid-philic inner surface of sidewall 336 may be used in combination with fins such as 384 or swirl flow dampers such as 390. For example in FIG. 26, the fins 384, particularly along ramps or ledges 386, may be liquid-phobic, while the inner surface of the sidewall therebetween, e.g. 338a, may be liquid-philic. The liquid-philic inner surface 338a of sidewall 336, which may or may not be provided by a liquid-philic media layer 396, may be used with or without the noted fins and with or without the noted swirl flow dampers. In one embodiment, for use in an internal combustion engine crankcase ventilation separator, media layer 396 is oleophilic.

In one embodiment, the disclosed rotating separator is an internal combustion engine crankcase ventilation rotating separator separating oil from air in blowby gas from the crankcase, with the inlet supplying blowby gas from the crankcase to hollow interior 332, the outlet delivering cleaned separated air from plenum 342, and the drain draining separated oil from plenum 342. In one embodiment, the noted fluid mixture is a gas-liquid mixture. In one embodiment, the noted fluid mixture is a liquid-liquid mixture including a first liquid separated from the mixture and drained to the drain, and a remaining liquid supplied to the outlet. In one embodiment, the rotating separator is a fuel-water separator, with the water being the noted first liquid, and the fuel being the noted remaining liquid.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. A rotating separator for separating liquid from a fluid mixture, the rotating separator comprising:
a separator assembly comprising a housing and an annular rotating separating filter element rotating about an axis extending along an axial direction in said housing, said annular rotating separating filter element having an inner periphery defining a hollow interior, and having an outer periphery, said housing having a sidewall with an inner surface facing said outer periphery of said annular rotating separating filter element and spaced along a radial direction radially outwardly of said annular rotating separating filter element by a plenum therebetween, said housing having an inlet for supplying said mixture to said hollow interior, said housing having an outlet delivering a separated component of said mixture from said plenum, said housing having a drain delivering separated liquid from said plenum, the direction of flow through said annular rotating separating filter element being inside-out from said hollow interior through said annular rotating separating filter element to said plenum, said plenum having one or more flow path separating guides minimizing the flow of separated liquid to said outlet, said one or more flow path separating guides comprising one or more fins extending into said plenum from said inner surface of said sidewall of said housing, wherein said fins are tilted into the flow path of liquid extending from said annular rotating separating filter element such that said one or more fins are pointing in a direction opposite to the direction of rotation of said annular rotating separating filter element.

2. The rotating separator according to claim 1 wherein said one or more flow path separating guides guide said separated liquid toward said drain.

3. The rotating separator according to claim 1 wherein said fins are arcuately spaced from each other along said inner surface of said sidewall of said housing.

4. The rotating separator according to claim 1 wherein said fins create capture grooves catching said liquid.

5. The rotating separator according to claim 1 wherein each said fin extends from a root end at said inner surface of said sidewall of said housing to a distal tip end in said plenum pointing in said direction opposite to the direction of rotation of said annular rotating separating filter element such that said fin and said inner surface of said sidewall of said housing form a wedge-shape cavity catching separated liquid.

6. The rotating separator according to claim 5 wherein said fins extend obliquely relative to said radial direction.

7. The rotating separator according to claim 1 wherein said one or more fins define one or more guide surfaces guiding separated liquid along a drain direction towards said drain.

8. The rotating separator according to claim 7 wherein said drain direction is normal to said radial direction.

9. The rotating separator according to claim 7 wherein said drain direction is tangential to said radial direction.

10. The rotating separator according to claim 9 wherein said one or more fins wind helically toward said drain.

11. The rotating separator according to claim 10 wherein said one or more helically wound fins have one or more axially extending slots formed therethrough for gravitational drainage of separated liquid through the respective slot.

12. The rotating separator according to claim 1 wherein said sidewall of said housing tapers away from said axis of rotation.

13. The rotating separator according to claim 12 wherein said plenum has an upper portion and a lower portion, said lower portion being gravitationally below said upper portion, said sidewall of said housing tapers away from said annular rotating separating filter element as said sidewall extends from said upper portion of said plenum toward said lower portion of said plenum, and said one or more flow path separating guides comprise one or more fins creating greater swirl in said plenum closer to said upper portion of said plenum and lesser swirl in said plenum closer to said lower portion of said plenum, to aid drainage of separated liquid toward said lower portion of said plenum and away from said upper portion of said plenum, and less entrainment of separated liquid in said swirl.

14. The rotating separator according to claim 1 wherein said one or more flow path separating guides are configured to create a tortuous path in said plenum.

15. The rotating separator according to claim 14 wherein said one or more flow path separating guides comprise at least one swirl flow damper in said plenum.

16. The rotating separator according to claim 15 wherein said plenum has an upper portion and a lower portion, said lower portion being gravitationally below said upper portion, and wherein said swirl flow damper is at said upper portion of said plenum.

17. The rotating separator according to claim 15 comprising a plurality of said swirl flow dampers in said plenum.

18. The rotating separator according to claim 15 wherein said swirl flow damper is adjacent said inner surface of said sidewall of said housing.

19. The rotating separator according to claim 15 wherein said swirl flow damper is upstream of said outlet.

20. The rotating separator according to claim 15 wherein said swirl flow damper includes a vortex tube.

21. The rotating separator according to claim 14 wherein said one or more flow path separating guides are configured to break down secondary flow in said plenum and create low shear recirculation zones for collection of separated liquid.

22. The rotating separator according to claim 1 wherein said one or more flow path separating guides are liquid-phobic.

23. The rotating separator according to claim 22 wherein said one or more flow path separating guides are oleophobic.

24. The rotating separator according to claim 1, wherein said inner surface of said sidewall includes a media layer.

25. The rotating separator according to claim 24 wherein said media layer comprises at least one fibrous media layer.

26. The rotating separator according to claim 24 wherein said media layer comprises at least one non-woven fibrous media layer.

27. The rotating separator according to claim 24 wherein said media layer comprises at least one woven screen.

28. The rotating separator according to claim 24 wherein said media layer comprises at least one wire mesh layer.

29. The rotating separator according to claim 24 wherein said media layer comprises a restrictive wrap.

30. The rotating separator according to claim 1 wherein said configured inner surface of said sidewall of said housing is liquid-philic.

31. The rotating separator according to claim 24 wherein said media layer is liquid-philic.

32. The rotating separator according to claim 31 wherein said media layer is oleophilic.

33. The rotating separator according to claim 1 wherein said rotating separator is an internal combustion engine crankcase ventilation rotating separator separating oil from air in blowby gas from the crankcase, said inlet supplying said blowby gas from said crankcase to said hollow interior, said outlet delivering cleaned separated air from said plenum, said drain draining separated oil from said plenum.

34. The rotating separator according to claim 1 wherein said fluid mixture is a gas-liquid mixture.

35. The rotating separator according to claim 1 wherein said fluid mixture is a liquid-liquid mixture comprising a first liquid separated from said mixture and drained to said drain, and a remaining liquid supplied to said outlet.

36. The rotating separator according to claim 35 wherein said rotating separator is a fuel-water separator.

37. The rotating separator according to claim 1 wherein said fins extend axially downward said inner surface of said sidewall of said housing in a rectilinear manner.

* * * * *